(12) United States Patent
Teraoka et al.

(10) Patent No.: US 7,233,547 B2
(45) Date of Patent: Jun. 19, 2007

(54) DISC-SHAPED RECORDING MEDIUM, MANUFACTURING METHOD THEREOF, AND DISC DRIVE DEVICE

(75) Inventors: Yoshiyuki Teraoka, Kanagawa (JP); Makoto Watanabe, Miyagi (JP)

(73) Assignee: Sony Corporation, Tokyo (JP)

( * ) Notice: Subject to any disclaimer, the term of this patent is extended or adjusted under 35 U.S.C. 154(b) by 543 days.

(21) Appl. No.: 10/486,543

(22) PCT Filed: Jun. 6, 2003

(86) PCT No.: PCT/JP03/07225

§ 371 (c)(1),
(2), (4) Date: Feb. 10, 2004

(87) PCT Pub. No.: WO04/001739

PCT Pub. Date: Dec. 31, 2003

(65) Prior Publication Data

US 2004/0196743 A1    Oct. 7, 2004

(30) Foreign Application Priority Data

Jun. 19, 2002    (JP) .............................. 2002-179050

(51) Int. Cl.
*G11B 11/00* (2006.01)
(52) U.S. Cl. ................. 369/13.06; 369/13.14
(58) Field of Classification Search ............ 369/13.15, 369/13.14, 13.08, 13.09, 13.22, 13.24, 44.11, 369/44.15, 44.17, 13.06
See application file for complete search history.

(56) References Cited

U.S. PATENT DOCUMENTS

| 4,672,594 | A | * | 6/1987 | Kato et al. ............... 369/13.15 |
| 5,136,558 | A | * | 8/1992 | Getreuer et al. ......... 369/44.15 |
| 5,195,074 | A | * | 3/1993 | Tanoshima et al. ...... 369/44.17 |
| 6,693,856 | B1 | * | 2/2004 | Shidochi et al. ......... 369/30.15 |
| 6,954,407 | B1 | * | 10/2005 | Gleim ..................... 369/44.11 |

FOREIGN PATENT DOCUMENTS

| JP | 60-170048 | 9/1985 |
| JP | 2-37544 | 2/1990 |
| JP | 6-4924 | 1/1994 |
| JP | 6-180876 | 6/1994 |
| JP | 6-290496 | 10/1994 |
| JP | 9-35346 | 2/1997 |
| JP | 9-293289 | 11/1997 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

A magneto-optical disk which reproduces information with an optical pickup head which uses an electromagnetic force as the driving force is provided. Other areas than at least the recording track are magnetized uniformly in a direction of canceling the influence of external magnetic field applied by the optical pickup head or a recording pattern having a frequency higher than modulation transfer function (MTF) of the optical pickup head is recorded to the other areas than at least the recording track. Read signals SP12 and SP14 from the magneto-optical disk are low in bit error rate.

24 Claims, 25 Drawing Sheets

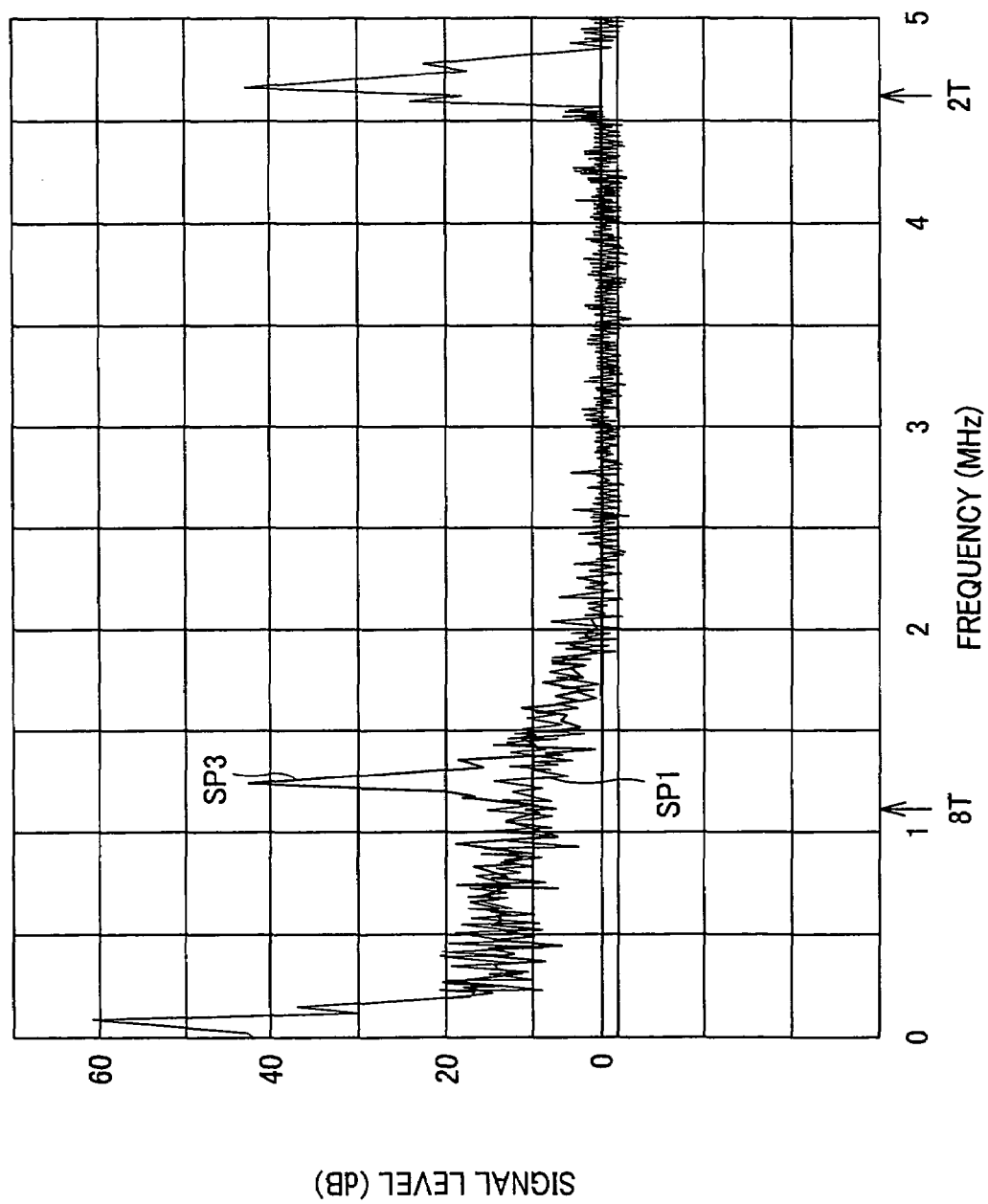

| | Mini disk (MD DATA) | Next-generation mini disk MD1 | Next-generation mini disk MD2 |
|---|---|---|---|
| Track pitch | 1.6 μm | 1.3 μm | 1.25 μm |
| Bit length | 0.59 μm/bit | 0.44 μm/bit | 0.16 μm/bit |
| λ·NA | 780 nm·0.45 | 780 nm·0.45 | 780 nm·0.45 |
| Recording method | Groove recording | Groove recording | Groove recording and DWDD |
| Addressing method | Single spiral both-side wobble | Single spiral both-side wobble | Single spiral both-side wobble |
| Modulation method | EFM | 1-7PP | 1-7PP |
| Error correction method | ACIRC | RS-LDC | LDC+BIS |
| Interleaving | By convolution | In each block | In each block |
| Redundancy | 46.3% | 20.50% | 20.50% |
| Detection method | bit by bit | PR(1,2,1)ML | PR(1,-1)ML |
| Linear velocity | 1.2 m/s | 2.4 m/s | 2.0 m/s |
| Data rate | 133 KB/s | 4.4 Mbit/s | 9.8 Mbit/s |
| Total capacity | 164 MB(140 MB) | 300 MB | 1 GB |
| Cluster structure (minimum unit for data rewrite) | 32 sectors +4 link sectors | 16 sectors | 16 sectors |

UMD3

| Sync 4 bits | Cluster H 4 bits | Cluster M 8 bits | Cluster L 4 bits | Sector 4 bits | BCH code parity 18 bits |
|---|---|---|---|---|---|
| 0   3 | 4   7 | 8   15 | 16   19 | 20   23 | 24   41 |

FIG.20B

UMD1

| Sync 4 bits | Cluster H 8 bits | Cluster L 8 bits | Sector 8 bits | BCH code parity 14 bits |
|---|---|---|---|---|
| 0   3 | 4   11 | 12   19 | 20   27 | 28   41 |

| Sync 4 bits | Cluster H 8 bits | Cluster L 8 bits | Sector 4 bits | BCH code parity 18 bits | |

FIG.21

DISC-SHAPED RECORDING MEDIUM, MANUFACTURING METHOD THEREOF, AND DISC DRIVE DEVICE

This application is a 371 of PCT/SP03/07225 Jun. 6, 2003

TECHNICAL FIELD

The present invention generally relates to a disk drive unit including an optical pickup head which uses an electromagnetic force as the driving force, a disk-shaped recording medium and a method of producing the recording medium, and more particularly to a disk-shaped recording medium incurring less noise from other than the recording track thereon, a method of producing the recording medium and a disk drive unit.

This application claims the priority of the Japanese Patent Application No. 2002-179050 filed on Jun. 19, 2002, the entirety of which is incorporated by reference herein.

BACKGROUND ART

Conventionally, the magneto-optical disk is known as a rewritable disk-shaped recording medium. Recently, various techniques have been developed for improving the recording density of the magneto-optical disk. One such technique has recently been disclosed in the Japanese Unexamined Application Publication No. 290496 of 1994, for example.

The playback technique disclosed in the above Japanese Unexamined Application Publication is a magnetic domain wall displacement detection type ultra-high resolution magneto-optical playback technique, called "DWDD (domain wall displacement detection)", used on a magneto-optical disk having at least three magnetic layers: displacement layer, switching layer and memory layer and which exploits the fact that the magnetic domain recorded in the memory layer will substantially be extended in the displacement layer. DWDD is to detect a magnetic domain wall displaced in an area in the displacement layer that corresponds to an area where a magnetic coupling between the memory and displacement layers corresponding to an area in the switching layer, irradiated with a read laser light for reading information signal and having reached a temperature higher than the Curie temperature, is broken, whereby a magnetic domain recorded in the memory layer is substantially extended in size in the displacement layer to increase read carrier signal.

The DWDD-based magneto-optical playback method (will be referred to as "DWDD playback method" hereunder) will be described in detail herebelow. In FIG. 1A, a magneto-optical disk to which the DWDD playback method is applied is generally indicated with a reference 100. As shown, the magneto-optical disk 100 is constructed of three magnetic layers including a displacement layer 101, switching layer 102 and memory layer 103. In the magneto-optical disk 100, the memory layer 103 is magnetized in different directions of arrows $M_1$ and $M_2$ as shown in FIG. 1A because of forward and reverse spins to record data as long as a magnetic domain. In this magneto-optical disk 100, a boundary between two successive magnetic domains 104 magnetized in different directions is a domain wall 105. It should be noted that an arrow R in FIG. 1A indicates the rotating direction of the magneto-optical disk 100.

When a read laser light BM is incident upon the magneto-optical disk 100, a temperature is distributed there as shown in FIG. 1B since the laser light BM provides a local heating. It should be noted that a reference Ts indicates a Curie temperature of the switching layer 102 and an area $D_p$ in the switching layer 102 where the temperature is higher than the Curie temperature Ts will be demagnetized. In the magneto-optical disk 100, the demagnetization in the switching layer 102 will lead to disappearance of the force of switched connection between the demagnetized area $D_p$ in the switching layer 102 and the memory layer 103. Thus in the magneto-optical disk 100, the domain wall having a lower coercivity as an area in the displacement layer 101 that corresponds to the area $D_p$ is singly displaced toward a higher-temperature side indicated with an arrow S in FIG. 1A. Such a displacement of the domain wall will take place each time the domain wall existing in the displacement layer 101 correspondingly to each recorded mark in the memory layer 103 reaches an isothermal curve of the temperature Ts as the magneto-optical disk 100 is scanned. With detection of such a domain wall displacement, data recorded in the memory layer 103 of the magneto-optical disk 100 is substantially extended and read. It should be noted that the domain wall is displaced to near a spot where the temperature is highest, for example, the rear of a beam spot.

The DWDD playback method is one of the important playback methods permitting to read a very large signal from a very small recording domain, as well, of which the period is smaller than the critical optical resolution of a read laser light, with a high density without having to change the wavelength of the read laser light, numerical aperture (NA) of objective lens, etc. Say, the DWDD playback method allows to considerably improve the recording density in the scanning direction of laser beam spot.

On the other hand, the recording methods includes mainly two types: optical modulation and magnetic field modulation. The magnetic field modulation permits to record a mark in smaller size and increase the volume of data to be recorded correspondingly.

In the magnetic field modulation type recording, a recording laser light whose output level is higher than at the time of disk playback is projected onto the magneto-optical disk 100, a modulation magnetic field corresponding to a signal to be recorded is applied to the magneto-optical disk 100 to write the signal to be recorded, as a mark, to a desired recording track. FIG. 2 shows the relation in shape between a beam spot SP defined by a write laser light on a recording track 100a and the mark 110 recorded to the memory layer 103 of the magneto-optical disk 100.

In the field modulation type recording, with the write laser light being projected onto the magneto-optical disk 1A, record is sequentially made by a modulated field to a hot spot 111 taking place nearly in the center of the beam spot SP correspondingly to the shape of the beam spot SP, with the result that the mark 110 will be recorded there, as shown in FIG. 22. Where the hot spot 111 takes place depends upon the shape of the beam spot SP. So, when the beam spot SP is generally circular as shown in FIG. 2, the recorded mark 110 will be shaped to copy the rear end of the hot spot 111. Namely, the mark 110 thus recorded will have a fletching-like shape. More specifically, the shape of an edge portion 110a, defining the profile, of the recorded mark 110 depends upon the curvature of the rear end of the beam spot SP. It should be noted that the temperature of the hot spot 111 will exceed a temperature higher than the Curie temperature in the memory layer 103 and it is different from a temperature of a hot spot taking place due to irradiation of a read laser light at the time of disk playback.

In the DWDD playback method, the mark 110 recorded by the field modulation type recording is reproduced by detecting a displacement of the edge portion 110a developed by heating with a projected read laser light. Thus, the DWDD playback method can improve the linear density of the magneto-optical disk.

In the production of the above-mentioned magneto-optical disk, a recording layer to which information is recorded, a protective layer for the recording layer, etc. are formed on a substrate. The layers just formed are magnetized in different directions, which will cause noises when information is written to or read from the disk. Once information is recorded to the disk, the noises to the recording track on the magneto-optical disk disappear. However, since recording is made only the recording track, so the disk will remain magnetized in different directions. In a disk having a small track pitch, the remaining nonuniform magnetization will cause a cross talk which degrades the signal S/N (signal-to-noise) ratio and hence the signal quality.

To solve this problem, the magneto-optical disk is initial-formatted in the final process of the production or just before shipment from the factory. Generally, the bulk erase method is used for initial formatting of mass-produced magneto-optical disks. In this method, the magneto-optical disks are placed in a furnace at a temperature higher than the Curie point of them to momentarily be heated to a high temperature so that the disk will be magnetized uniformly in the same direction. However, the ultra-high resolution magneto-optical disk such as DWDD type disk, even if processed by the bulk erase method, incurs much noise during information recording or reproduction and shows no good detrack characteristic at the time of disk playback.

Also, the biaxial actuator for focusing and tracking a light beam scanning a magneto-optical disk generally uses an electromagnetic force as the driving force and so it is provided with a magnetic circuit including a magnet. The magnet included in the magnetic circuit produces a leakage flux under the influence of which noises will be increased during recording or reproduction of information to or from the magneto-optical disk.

DISCLOSURE OF THE INVENTION

It is therefore an object of the present invention to overcome the above-mentioned drawbacks of the related art by providing a novel disk-shaped recording medium, a method of producing the recording medium, and a disk drive unit using the disk-shaped recording medium.

The above object can be attained by providing a disk-shaped recording medium to be played in a disk drive unit which reproduces information recorded in the disk-shaped recording medium by an optical pickup head including a drive means which uses an electromagnetic force as the driving force, and which has recorded therein a signal which reduces the influence of an electromagnetic field applied by the optical pickup head. The signal recorded in the disk-shaped recording medium is a one recorded by a magnetization in a direction of reducing the influence of the electromagnetic field applied by the optical pickup head.

In the above disk-shaped recording medium according to the present invention, the influence of a leakage flux from the driving means in the optical pickup head is reduced, thereby permitting to lessen noises cross talk caused by a cross talk during information reproduction.

In the above disk-shaped recording medium according to the present invention, other areas than at least the recording track can be magnetized uniformly in the same direction and the signal to reduce the influence of the electromagnetic field applied by the optical pickup head in a direction generally opposite to that of a fringing field from the optical pickup head. Further, according to the present invention, the disk-shaped recording medium can be a magneto-optical disk which is to be played with the magnetic domain wall displacement detection type ultra-high resolution magneto-optical playback technique.

Also in the above disk-shaped recording medium according to the present invention, since other areas than the recording track, that is, the land in the groove-recording system or the groove in the land-recording system, is magnetized uniformly in a direction of canceling the influence of external magnetization in order to lessen noises from other parts than the recording track, it is possible to assure a good detrack characteristic at the time of disk playback without any influence of the remaining nonuniform magnetization in disk layers just after formed and influence of a leakage flux applied by the optical pickup head.

The aforementioned signal recorded to the above disk-shaped recording medium according to the present invention may be a recording pattern signal having a higher frequency component than a modulation transfer function (MTF) of the optical pickup head. Since there is recorded such a recording pattern having the higher frequency component than the modulation transfer function (MTF) of the optical pickup head, so it is possible to assure a good detrack characteristic at the time of disk playback without influence of the remaining nonuniform magnetization as in the initial state and influence of a drifting magnetic field caused by the uniform magnetization.

Also the above object can be attained by providing a method of producing a disk-shaped recording medium to be played in a disk drive unit which reproduces information recorded in the disk-shaped recording medium by an optical pickup head including a drive means which uses an electromagnetic force as the driving force, the method including, according to the present invention, the step of recording to the recording medium a signal which reduces the influence of an electromagnetic field applied by the optical pickup head. The signal recorded in the signal recording step is recorded by a magnetization in a direction of reducing the influence of the electromagnetic field applied by the optical pickup head.

In the above disk-shaped recording medium producing method according to the present invention, the influence of a leakage flux from the driving means in the optical pickup head is reduced, thereby permitting to lessen noises caused by a cross talk during information reproduction.

Also the above object can be attained by providing a disk drive unit which reproduces information recorded in a disk-shaped recording medium by an optical pickup head including a drive means which uses an electromagnetic force as the driving force, the apparatus including according to the present invention a recording means for recording to the disk-shaped recording medium a signal which reduces the influence of an electromagnetic field applied by the optical pickup head.

In the above disk drive unit according to the present invention, the signal recorded in the disk-shaped recording medium is a one recorded by magnetization oriented to reduce the influence of the magnetic field applied by the optical pickup head.

In the above disk drive unit according to the present invention, the influence of a leakage flux from the driving means in the optical pickup head is reduced, thereby permitting to lessen noises caused by a cross talk during information reproduction.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 7 graphically illustrates the spectrum of read signal recorded in a 2T cycle and reproduced after initial formatting of the groove-recording type magneto-optical disk by writing an initial pattern having an 8T cycle lower than MTF to the land;

FIG. 11 shows specifications of the first-generation (conventional) mini disk, next-generation mini disk MD1 and next-generation mini disk MD2;

FIGS. 20A and 20B show together the ADIP data structure;

FIG. 21 explains how to embed disk control signal in ADIP signal in the next-generation mini disk MD2;

BEST MODE FOR CARRYING OUT THE INVENTION

The present invention will be described in detail concerning its embodiment below with reference to the accompanying drawings.

First, an application of the present invention to a magneto-optical disk adopting a so-called magnetic domain wall displacement detection (DWDD) type ultra-high resolution playback method will be explained by way of example. In this magneto-optical disk, noises from other areas than a recording track where data to be recorded and noises due to cross talk are lessened by magnetizing the land in a groove-recording type magneto-optical disk or groove in a land-recording type magneto-optical disk uniformly in a direction of canceling the influence of a fringing field from a biaxial actuator in an optical pickup head which uses an electromagnetic force as the driving force. More specifically, the above can easily be attained by magnetizing the entire surface of a magneto-optical disk uniformly in a direction opposite to the fringing field.

As above, the layers of a magneto-optical disk, just after formed, are not magnetized uniformly in a direction, which will cause cross talk as a noise. Such a noise from the recording track on the magneto-optical disk will disappear once information is recorded to the disk. Since no recording is made to other areas than the recording track, however, the nonuniform magnetization remains as in the initial state. In case of a disk having a track formed thereon with a narrow pitch, the nonuniform magnetization will come out as a cross talk which will degrade the S/N ratio of signals and hence the signal quality.

On this account, the magneto-optical disk undergoes an initial formatting at an appropriate time before it is used, namely, in the final process of the production or before shipment from the factory. The initial formatting is such that the land in a magneto-optical disk of the groove-recording type, or the groove in a magneto-optical disk of the land-recording type, are magnetized uniformly in a direction of canceling any external magnetic field. Thus, it is possible to considerably lessen noises and improve the detrack characteristic at the time of disk playback.

The present invention will be described concerning an application thereof to a groove-recording type magneto-optical disk by way of example.

Figures 1A, 1B:
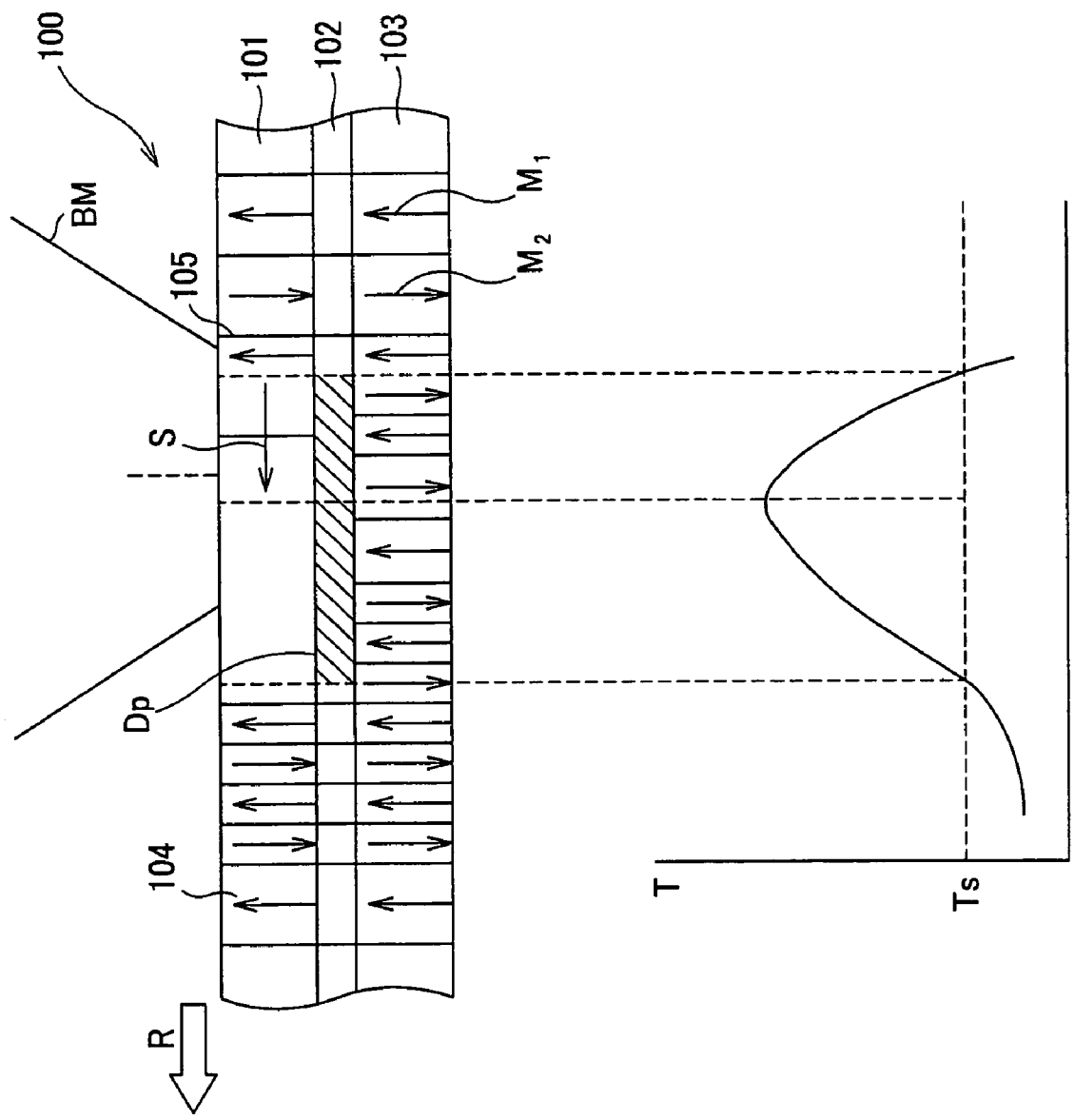
FIG. 1A is a schematic cross-sectional view for explanation of playback operations of a magneto-optical disk adopting the magnetic domain wall displacement detection type ultra-high resolution playback method (DWDD playback method)
FIG. 1B shows temperature distribution taking place when playback laser light is irradiated to a magneto-optical disk.
Figure 2:
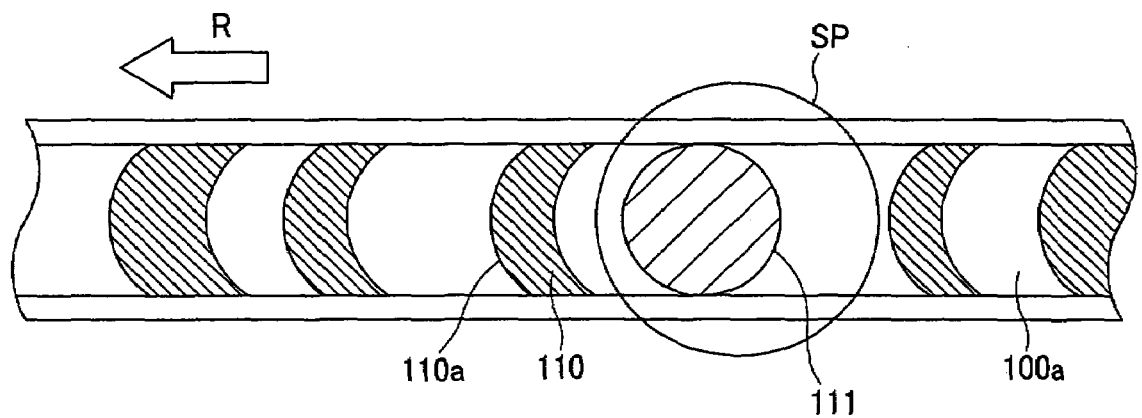
FIG. 2 is a schematic plan view showing the relation between a beam spot and mark recorded in the magneto-optical disk adopting the magnetic domain wall displacement detection type ultra-high resolution playback method (DWDD playback method)
Figure 3:
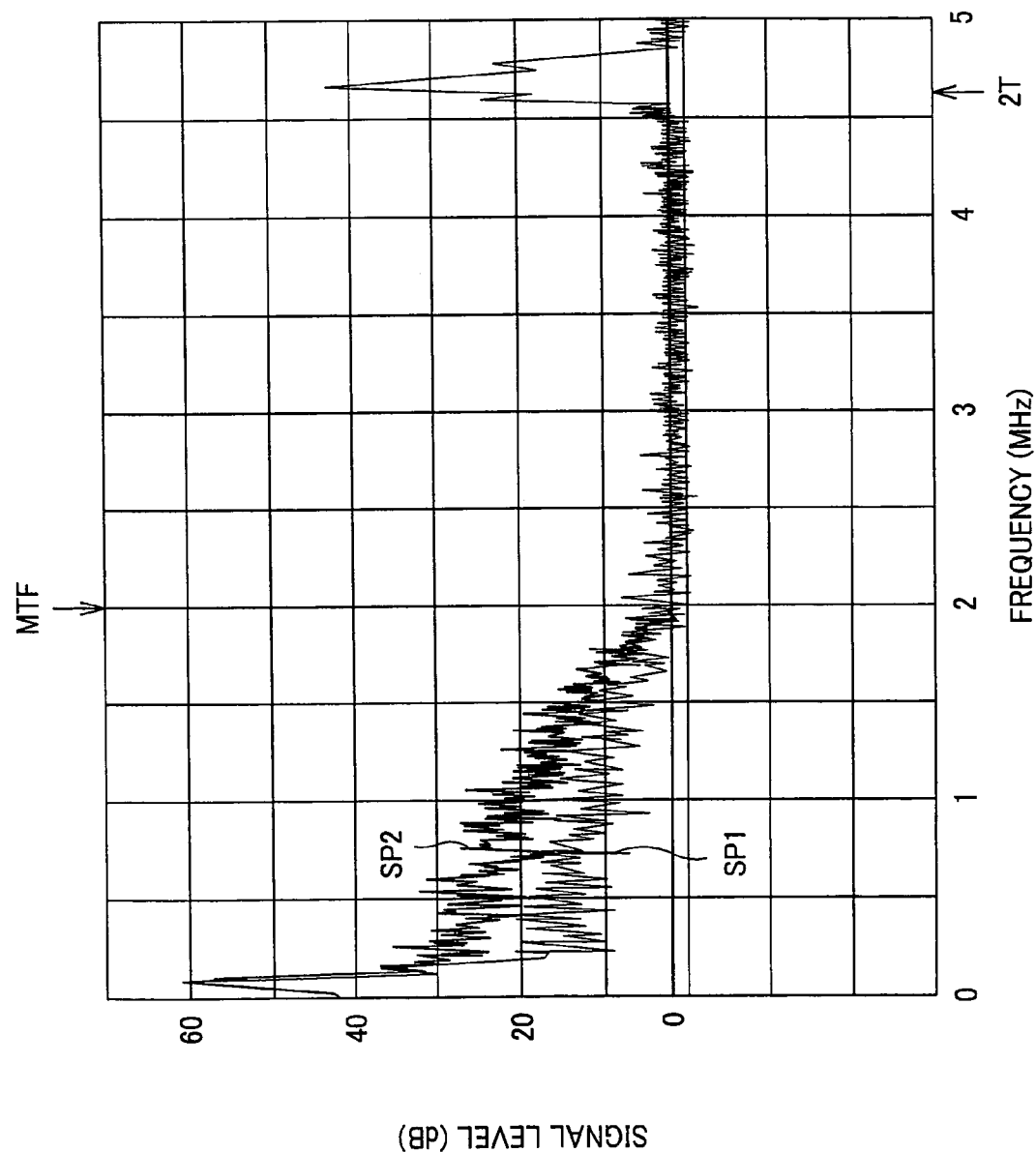
FIG. 3 graphically illustrates the spectrum of read signal recorded in a cycle of 2T to a groove-recording type magneto-optical disk as a first embodiment of the present invention, having the land magnetized uniformly in a direction.

FIG. 3 graphically illustrates the spectrum of read signal recorded in a 2T cycle to the groove-recording type magneto-optical disk in which the land is magnetized uniformly in a direction. The horizontal axis of the graph in FIG. 3 indicates a frequency, and vertical axis indicates a signal level. Also, "T" indicates a bit interval of input data. It should be noted that for comparison, there is also shown a spectrum of read signal recorded to the groove in a 2T cycle in a magneto-optical disk having not undergone the initial formatting after forming the layers, namely, which has the layers magnetized in different directions. In the following explanation, the state of the magneto-optical disk having the layers thereof still magnetized non-uniformly after the layers are formed will be referred to as "initial state". In FIG. 3, there is shown a read signal from data recorded in the 2T cycle to the groove and which has a peak nearly at 4.5 to 5 MHz. As shown in FIG. 3, at the low-frequency size, a read signal SP1 in the magneto-optical disk whose land is magnetized uniformly in the same direction according to the present invention incurs less noises than a read signal SP2 in a magneto-optical disk being in the initial state.

In the magneto-optical disk according to the present invention, other areas than the recording track are magnetized in the same direction. This direction is opposite to that of a leakage flux which is a direction of canceling the influence of external magnetic field such as a leakage flux etc. from the disk drive unit. There will be explained below the reason why the areas other than the recording track should be magnetized uniformly in the direction of canceling the influence of the external magnetic field.

The recording layer of a magneto-optical disk just after having the layers formed thereon is not uniformly magnetized. So, in case tracks are formed, the uneven magnetization will come out as a cross talk which will degrade the S/N ratio of signals and hence the signal quality. By magnetizing a ultra-solution magneto-optical disk having a narrow track pitch such as DWDD type uniformly in a direction, it is possible to lessen noises. In some cases, however, a drifting magnetic field from the uniformly magnetized areas prevents the mark itself from expanding, resulting in a worse error rate.

Figure 4A:
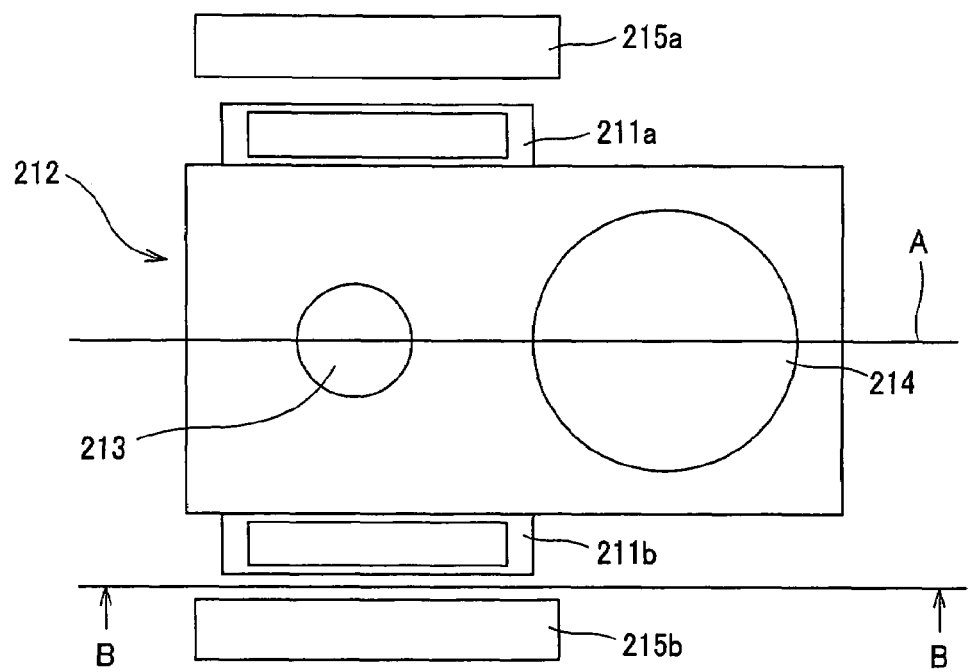
FIG. 4A is a plan view of a focusing-directional drive circuit as an example of the actuator of the optical pickup head.
Figure 4B:
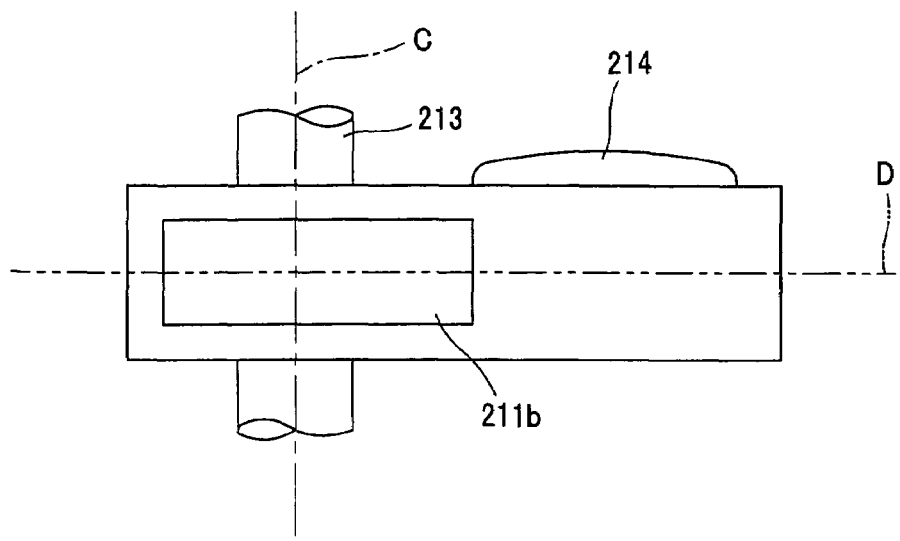
FIG. 4B is a side elevation taken along the line B—B in FIG. 4A.

Also, the magneto-optical disk is adversely affected by a fringing field from the biaxial actuator controlling the optical pickup head as well as by the remaining nonuniform magnetization as in the initial state. That is, in the ultra-solution magneto-optical disk such as DWDD, any external magnetic field will prevent the mark from expanding, resulting in a detrack characteristic at the time of disk playback. Generally, the biaxial actuator for controlling the focusing and tracking of the optical pickup head in the disk drive unit is driven by a magnetic circuit. FIGS. 4A and 4B schematically illustrate, as an example of the biaxial actuator, a drive mechanism which drives to move an objective lens in a focusing direction parallel to the optical axis. FIG. 4B is a side elevation taken along the line B—B in FIG. 4A.

As shown in FIGS. 4A and 4B, the drive mechanism, indicated with a reference 210, includes a moving block 212 laid between focus coils 211a and 221b and sliding on a shaft 213. The moving block 212 has mounted thereon an objective lens 214 by which laser light is condensed and irradiated to the disk surface. Outside the focus coils 211a and 211b, there are disposed magnets 215a and 215b between which a magnetic field is formed. In the drive mechanism 210, when a current I flows through the focus coils 211a and 211b, the magnetic field formed by the magnets 215a and 215b provides an electromagnetic force which slides the moving block 212 on the shaft 213. Thus, the moving block 212 can be moved in a direction orthogonal to the disk surface. The direction and magnitude of the electromagnetic force, namely the movement of the optical pickup head in the focusing direction, can be controlled according to the direction and magnitude of the current flowing through the focus coils 211a and 211b.

At this time, a magnetic flux produced under the action of the current through the focus coils 211a and 211b leaks to outside the focus coils 211a and 211b. Also, a magnetic flux is produced by the magnets 215a and 215b. These magnetic fluxes leak and become noises at the time of magneto-optical disk playback.

Figure 5:
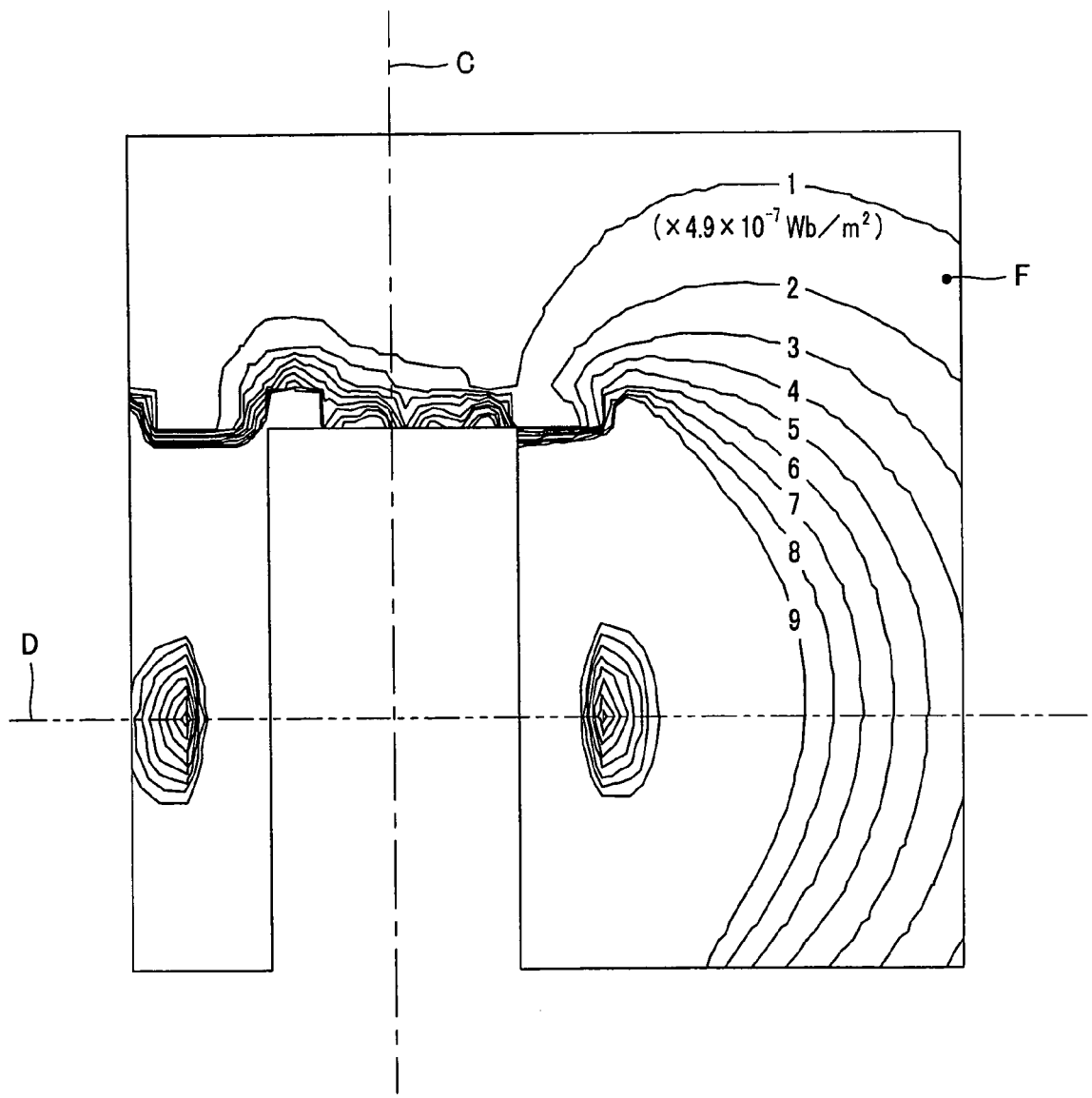
FIG. 5 shows the result of a simulation of the intensity distribution (magnetic flux density) of a leakage flux in a test area in a section taken at a position A in FIG. 4A.

FIG. 5 shows the result of a simulation of the intensity distribution (magnetic flux density) of a fringe magnetic flux in a test area in a section taken at a position A in FIG. 4A. In FIG. 5, numerals "1" to "9" indicate isopycnic lines of $1\times4.9\times10^{-7}$ Wb/m$^2$ ($4.9\times10^{-4}$ G) to $9\times4.9\times10^{-7}$ Wb/m$^2$ in magnetic flux density, respectively, and dashed lines C and D indicate positions, respectively, corresponding to dashed lines C and D in FIG. 4B. In FIG. 5, a point F indicates a focal point of the objective lens 214, that is, a position where the disk is disposed. This position is located between the isopycnic lines of $1\times4.9\times10^{-7}$ Wb/m$^2$ ($4.9\times10^{-4}$ G) to $2\times4.9\times10^{-7}$ Wb/m$^2$ in magnetic flux density. As shown in FIG. 4B, in case the objective lens 214 is laid asymmetrically with respect to the magnets 215a and 215b, one-directional leakage magnetic flux will take place and so the magnetic field caused by the leakage flux near the coils 211a and 211b is the strongest. Thus, a magnetic field caused by the leakage flux takes place at the point F as the focal point, as well.

Since the biaxial actuator for the focusing and tracking uses the magnets as above, the magnetic flux will unavoidably leak to outside the magnetic circuit. The leakage magnetic flux can be reduced to some extent by thickening the yokes, balancing the magnets 215a and 215b or separating the drive circuit itself from the objective lens as much as possible, which however will make it difficult to design a smaller biaxial actuator. Therefore, in case a biaxial actuator which uses an electromagnetic force as the driving force is used in the disk drive unit, a fringing field as shown in FIG. 5 will take place.

To eliminate the influence of the nonuniform magnetization of other areas than the recording track and influence of the fringing field from the actuator, the Inventors of the present invention have made researches and experiments and found that magnetization of areas other than at least recording track uniformly in a direction of canceling the influence of external magnetic field permits to cancel such influence and thus lessen noises and assure a good detrack characteristic at the time of disk playback. More specifically, by magnetizing a magneto-optical disk uniformly in a direction opposite to that of a fringing field applied to the disk loaded in a disk recorder/player (in the initial formatting process), it is possible to cancel the influence of the remaining nonuniform magnetization as in the initial state, and influence of the fringing field from the biaxial actuator which controls the optical pickup head.

Figure 6A:
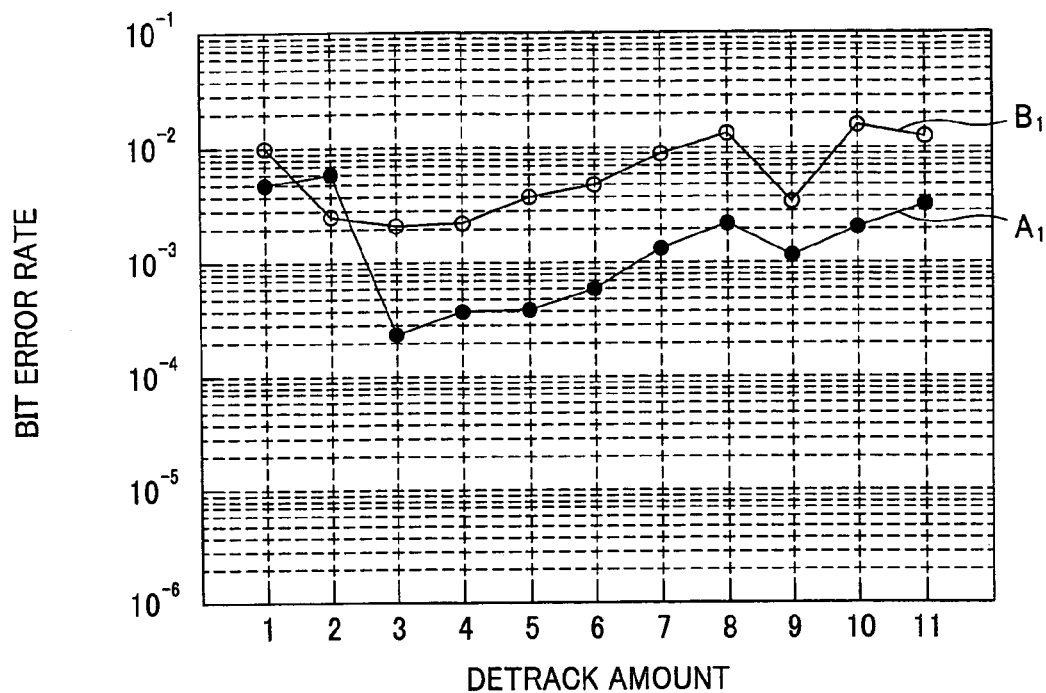
FIGS. 6A and 6B show together the detrack characteristic, at the time of disk playback, of the magneto-optical disk according to the present invention, more particularly, a graph showing the result of comparison in bit error rate between the magneto-optical disks according to the present invention, magnetized uniformly in a direction opposite to that of a fringing field from the actuator in the initial formatting of the groove-recording type magneto-optical disk and conventional magneto-optical disks, magnetized in the same direction as that of a fringing field.
Figure 6B:
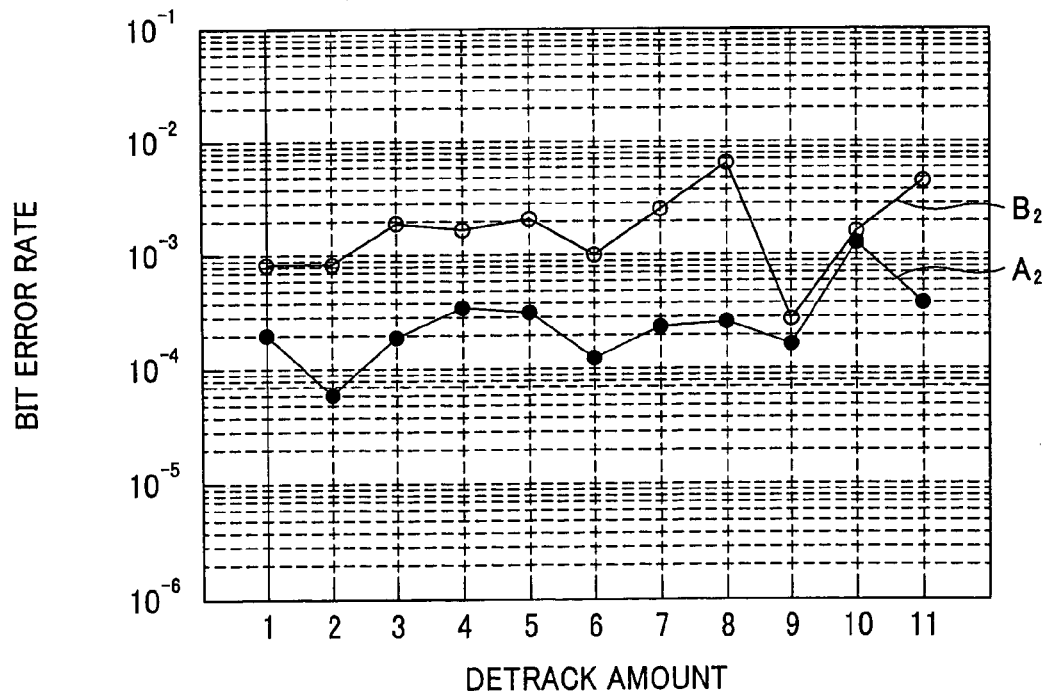

FIGS. 6A and 6B show together the detrack characteristic, at the time of disk playback, of the magneto-optical disk according to the present invention, more particularly, a graph showing the result of comparison in bit error rate between the magneto-optical disks as embodiments 1 and 2 of the present invention, magnetized uniformly in a direction opposite to that of a fringing field (external magnetic field) from the actuator in the initial processing of the groove-recording type magneto-optical disk, and conventional magneto-optical disks as comparative examples 1 and 2, magnetized in the same direction as that of a fringing field.

In FIG. 6A, the characteristic of the embodiment 1 is indicated with a reference $A_1$ and that of the comparative example 1 is with a reference $B_1$. In FIG. 6B, the characteristic of the embodiment 2 is indicated with a reference $A_2$ and that of the comparative example 2 is with a reference $B_2$.

FIGS. 6A and 6B show the data acquired with the external magnetic field applied to the magneto-optical disks in different directions, respectively. In FIGS. 6A and 6B, the vertical axis indicates a bit error rate (ratio between a number of error bits per unit time and a total number of bits handled in the unit time), and horizontal axis indicates test points freely selected for examining the inter-measurement variation of the bit error rate. The embodiments 1 and 2 have written thereto data of the same polarity (code) with which they are magnetized in a direction opposite to that of the external magnetic field. Also, the comparative examples 1 and 2 have written thereto data of the same polarity (code) with which they are magnetized in the same direction as that of the external magnetic field.

As seen from FIGS. 6A and 6B, the bit error rate in the embodiments 1 and 2 magnetized uniformly in a direction opposite to that of a fringing field is more than one digit smaller than those in the comparative examples 1 and 2. Namely, uniform magnetization enables to remove the influence of the remaining nonuniform magnetization, but a bit error will take place under the influence of an external magnetic field. On this account, the disk has to be magnetized in a direction opposite to that of an external magnetic field as will be known from the experimental data on the embodiments 1 and 2.

In the foregoing, the present invention has been explained concerning a disk of the groove-recording type. Also in a land-recording type disk, the same effect as above can be attained by magnetizing the land uniformly in a direction opposite to that of a fringing field. Advantageously, the initial formatting of magneto-optical disks according to the present invention, in which other than the recording track is magnetized, can be made in the final process of the magneto-optical disk production or before shipment from the factory.

Magnetizing a magneto-optical disk uniformly in a predetermined direction may be such that a magneto-optical disk is put into a furnace heated to a temperature higher than the Curie point of the magnetic layer of the disk and applied with a magnetic field in one direction to momentarily heat the disk to a high temperature, thereby magnetizing the magnetic layer uniformly in a direction. This is the so-called bulk erase method. The entire disk surface can be uniformly magnetized by the bulk erase method. In this case, the effect of the present invention can be more effectively attained by magnetizing the disk uniformly in a direction opposite to that of a fringing field in the disk drive unit or by recording/playing back the disk in a disk drive unit in which there occurs a fringing field direction opposite to the magnetized direction of the disk in such an initial formatting. Alternately, areas other than the recording track can be magnetized oppositely to the direction of external magnetic field by writing signals of the same polarity (code) and directed opposite to the direction of the external magnetic field, to the other areas than the recording track.

Next, the present invention will be described concerning the second embodiment thereof. In the aforementioned first embodiment, the initial formatting of the magneto-optical disk is to magnetize other areas than the recording track uniformly in a direction of canceling the influence of external magnetic field. According to this second embodiment, a recording pattern having a frequency component higher than the modulation transfer function (MTF) is written to other areas than the recording track of the disk.

As having been described in the foregoing, in the magneto-optical disk, the nonuniform magnetization remains as in the initial state just after the disk layers are formed, and it will remain in the other areas than the recording track even after the disk is played and degrade read signal. On this account, the Inventors of the present invention made further researches and experiments and found the fact that the detrack characteristic at the time of disk playback could be improved by writing a recording pattern having a frequency exceeding MTF of the optical pickup head to other areas than at least the recording track of the disk.

Figure 8:
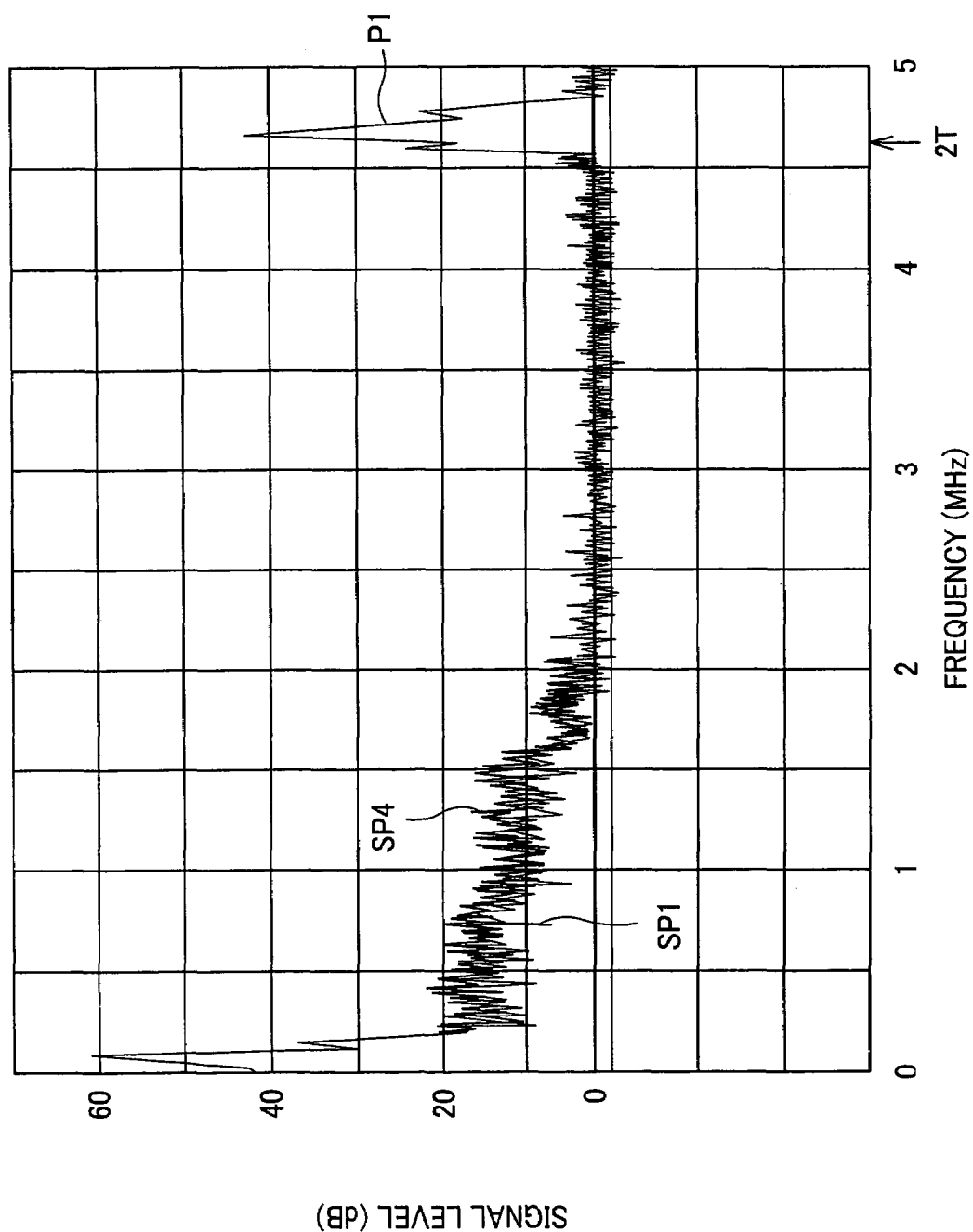
FIG. 8 graphically illustrates the spectrum of read signal recorded in a 2T cycle and reproduced after initial formatting of the groove-recording type magneto-optical disk by writing an initial pattern having a 2T cycle higher than MTF to the land.

In this initial formatting, a short initial pattern is written to other areas than the recording track in the magneto-optical disk, namely, to the land in a groove-recording type disk or to the groove in a land-recording type disk. If the frequency of the signal is lower than MTF of the optical pickup head, the signal as the written recording pattern will leak into the read signal when the recording pattern is read, as shown in FIG. 7. FIG. 7 graphically illustrates a spectrum (SP3) of read signal recorded in a 2T cycle and reproduced after initial formatting of the groove-recording type magneto-optical disk by writing an initial pattern having an 8T cycle lower than MTF to the land. In FIGS. 7 and 8, a spectrum (SP1) of read signal shown in FIG. 3, recording in the 2T cycle to the disk whose land is magnetized uniformly in a direction is also shown for reference. In FIGS. 7 and 8, the horizontal axis indicates a frequency and vertical axis indicates a signal level.

As shown in FIG. 7, noises are lessened as compared with those in the initial state but in a position of 1 to 1.5 MHz in frequency, there is seen a peak which indicates a large noise corresponding to the 8T cycle of the read signal.

FIG. 8 graphically illustrates a spectrum (SP4) of read signal recorded in a 2T cycle and reproduced after initial formatting of the groove-recording type magneto-optical disk by writing an initial pattern having a 2T cycle higher than MTF to the land. Since the recording pattern whose frequency is higher than MTF is recorded as an initial pattern as shown in FIG. 7, so noises can be lessened with no leakage of the initial pattern into the read signal.

The reason why a recording pattern whose frequency is higher than MTF of the optical pickup head is written will be described in detail below. A mark whose linear density is higher than MTF of the optical pickup head can be recorded to or read from an ultra-high resolution magneto-optical disk such as DWDD. However, the radial track pitch is limited by cross talk and cross write. But influence of the cross write can considerably be suppressed by interposing a land (when the disk is of a groove-recording type) or a groove (when the disk is of a groove-recording type) between the recording tracks. Regarding the cross talk in a disk which is an ultra-high resolution magneto-optical disk such as DWDD, since the recorded mark will not expand unless the disk has reached a higher temperature than a certain temperature, a signal whose frequency is higher than MTF of the optical pickup head and recorded in the land (when the disk is of a groove-recording type) or groove (when the disk is of a land-recording type), namely, an area other than the recording track, will not appear in case the disk is an ultra-high resolution magneto-optical disk such as DWDD.

However, a signal having a frequency lower than MTF of the optical pickup head will appear as it is. The signal will be a noise and degrade the S/N ratio of read signal, which is a problem in a disk in which the recording track is formed with a narrower pitch. To lessen noises from other areas than the recording track, a repetitive initial pattern having a frequency higher than MTF is written to the other areas than the recording track of the magneto-optical disk. Thus, the initial pattern will not appear in the read signal with no cross talk and less noise.

Next, the magneto-optical disk producing method according to the present invention will be described concerning a method of writing a repetitive pattern as an initial pattern to other areas than the recording track, for example, the land when the disk is of a groove-recording type, namely, a method of tracking the optical pickup head to the land.

Figure 9:
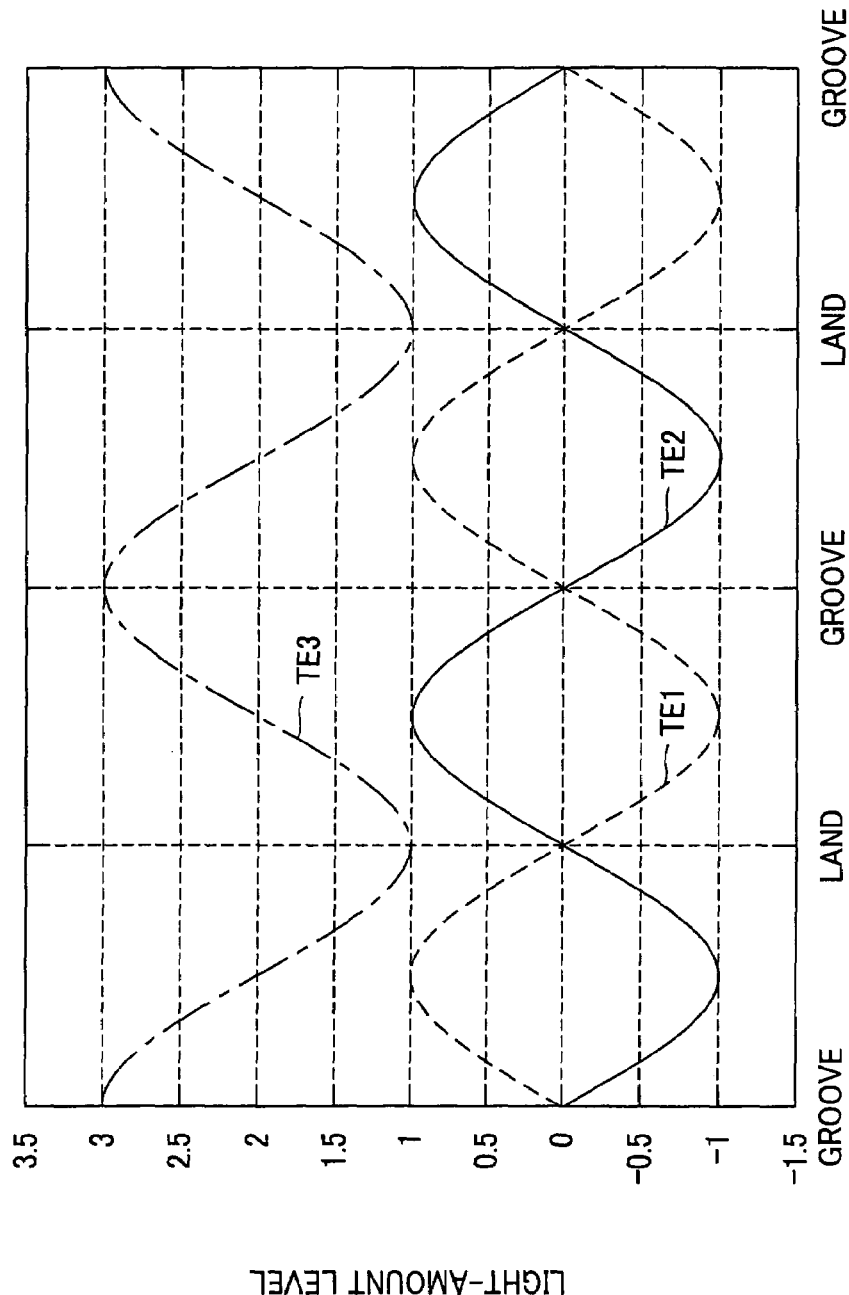
FIG. 9 graphically illustrates the relation between pull-in and push-pull signals used as error signals for making tracking servo.

FIG. 9 graphically illustrates the relation between pull-in and push-pull signals used as error signals for making tracking servo. As shown in FIG. 9, the tracking error (push-pull) signal TE1 indicates an output difference between two photodetectors on a bi-block photodiode, disposed symmetrically with respect to the track center to detect light reflected and diffracted by a groove on the disk. The pull-in signal TE3 is to control the tracking direction. The vertical axis indicates a light-quantity level of the tracking error signal TE1 relative to a zero light-amount point in the grove, and horizontal axis indicates a radial position of the disk.

In case a disk drive unit designed to track the optical pickup head to a groove according to the tracking error signal TE1 indicated with a broken line is used, an apparent tracking error signal TE2 indicated with a solid line can be provided by electrically inverting the tracking error signal TE1. By making tracking servo thereof in this condition, the optical pickup head can easily be tracked to a land other than the recording area.

Figure 10:
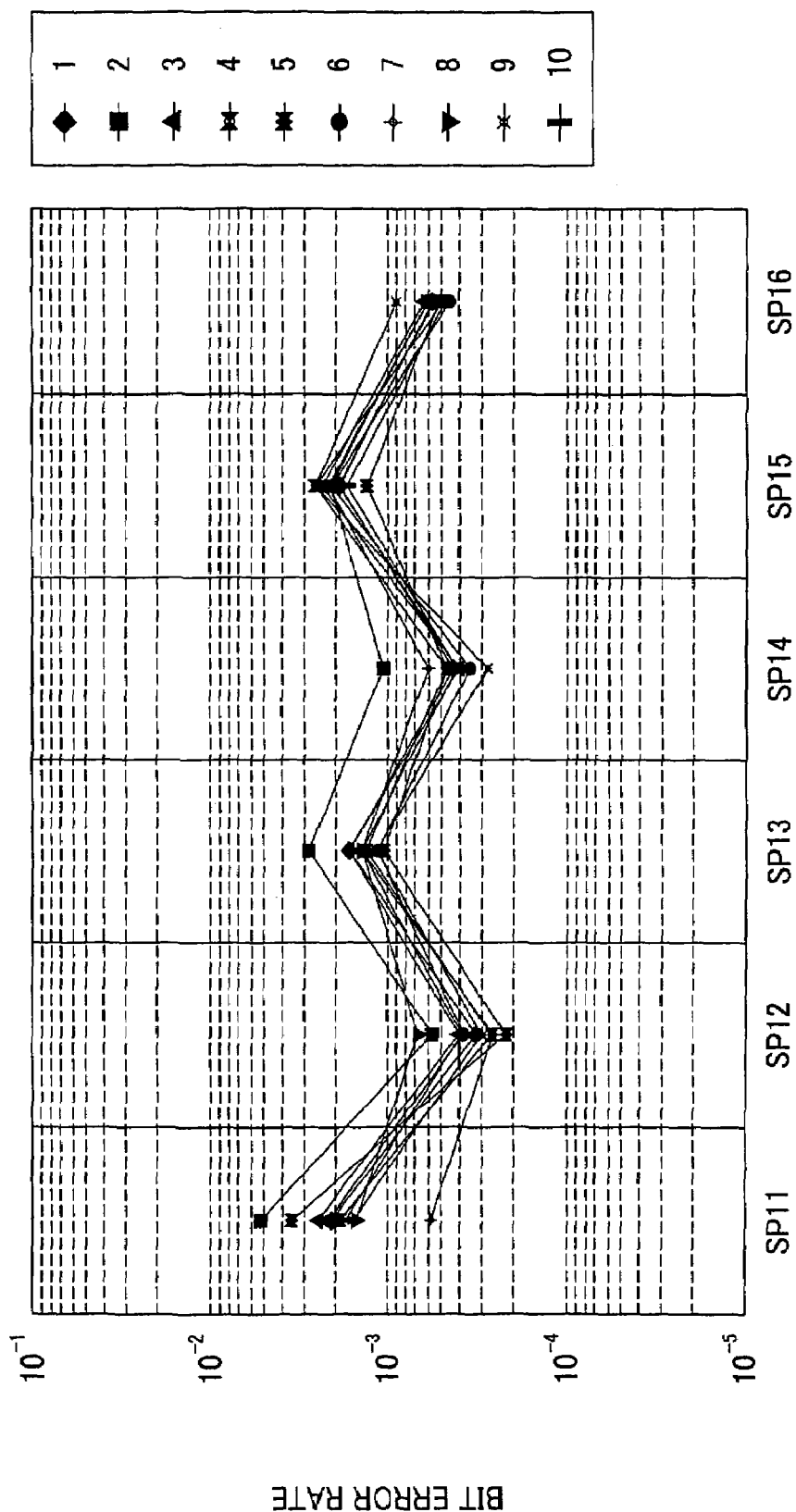
FIG. 10 graphically illustrates the bit error rate of read signal of the magneto-optical disk according to the present invention.

FIG. 10 shows the effect in the first and second embodiments of the present invention, namely, it graphically illustrates the bit error rate of read signal in the magneto-optical disk. In FIG. 10, the horizontal axis concerns the initial formatting of the magneto-optical disk. SP11 indicates bit error rates in an initial state where the magnetized direction is random just after the disk layers are formed, SP12 indicates bit error rates in the aforementioned magneto-optical disk as the first embodiment magnetized uniformly in a direction opposite to that of fringing field, namely, in which the magnetized direction in the initial-formatted state is opposite to that of the fringing field, SP13 indicates bit error rates in the conventional magneto-optical disk magnetized in the same direction as that of the fringing field, namely, in which the magnetized direction in the initial-formatted state is the same as that of the fringing field, SP14 indicates bit error rates in the magneto-optical disk as the second embodiment having a repetitive pattern recorded to other areas than the recording track in a 2T cycle whose frequency is higher then MTF, and SP15 and SP16 indicate bit error rates measured in magneto-optical disks having a repetitive pattern recorded to other areas than the recording track in an 8T cycle whose frequency is lower than MTF and having a random pattern recorded thereon, respectively. The error bit rates were measured when data is recorded and reproduced in a 2T cycle. It should be noted that all the bit error rates (SP11 to SP16) were measured at 10 points freely selected to examine the variation from one measurement to another.

As shown in FIG. 10, the bit error rate is large in the magneto-optical disk magnetized in random directions (SP11), disk magnetized uniformly in the same direction as that of external magnetic field (fringing field) (SP13) and disk having recorded thereto the repetitive pattern having a frequency lower than MTF (SP15). On the contrary, the bit error rate is low in the magneto-optical disk magnetized in a direction opposite to that of the external magnetic field according to the present invention (SP12) and disk having recorded thereto the repetitive pattern whose frequency is higher than MTF (SP14). Also, as seen from FIG. 10, the results of measurements made at the same positions on each of the magneto-optical disks are indicated on the same line. Similar results were obtained from the measurements made at any position.

Note that the embodiments of the present invention have been described concerning the groove-recording type disk but the same effect can of course be attained by repeatedly recording a pattern whose frequency is higher than MTF to the groove in a land-recording type disk.

Further note that the initial formatting of the magneto-optical disk by writing an initial pattern having a higher frequency than MTF is written may be done using a disk drive unit in the final process of the magneto-optical disk production, before shipment from the factory or before the user uses the disk.

As having been described in the foregoing, the present invention permits to provide a magneto-optical disk intended for ultra-high resolution images such as DWDD images which has a narrower-pitched recording track without having to improve the performance of the optical pickup head. The magneto-optical disks as the first and second embodiments include a one having a small diameter of 64 mm, namely, a so-called mini-disk (registered trademark). As such embodiments of the present invention, the mini disks will be described herebelow. There will be described a next-generation mini disk MD1 (will be referred to as "next-generation MD1" hereunder) which uses the same recording medium as the conventional magneto-optical disk and has the recording capacity thereof increased by applying a different recording format from that used in the conventional magneto-optical disk, and also a next-generation mini disk MD2 (will be referred to as "next-generation MD2" hereunder) which uses a new recording medium capable of a high-density recording and has the recording capacity thereof increased by applying a new recording format.

Prior to starting the detailed explanation of the embodiments, the magneto-optical disks having the above formats, respectively, namely, the existing MD, next-generation MD1 and next-generation MD2 will be described herebelow:

1. Disk Specifications and Area Structure

First, the specifications the conventional MDs® will be explained with reference to FIG. 11. The conventional mini disks (MD) include an audio MD destined primarily for recording and reproduction of audio data and MD-DATA destined primarily for recording and reproduction of data handled in an information processing apparatus. The physical format of the conventional mini disk (MD) is determined as follows. These MDs have a track pitch of 1.6 μm and a bit length of 0.59 μm/bit. Also, in the optical system form the MD, the laser wavelength $\lambda$ is $\lambda=780$ nm and numerical aperture (NA) of the optical pickup head is NA=0.45. The recording system adopted is the groove-recording. Say, a groove (formed in the disk surface) is used as a track for recording and playback. Also, the addressing method adopted for this MD uses a wobbled groove. Namely, a single-spiral groove is formed on the disk surface, and a wobble is formed as address information along either side of the groove. It should be noted that an absolute address recorded as a wobble is also called ADIP (addresses in pregroove).

The conventional MD adopts the EFM (eight-fourteen modulation) method to modulate data to be recorded. Also, it employs the ACIRC (advanced cross interleave Reed-Solomon code) method for error correction. Further, the data interleaving is the convolution type. Thus, the data redundancy is 46.3%.

Data is detected "bit by bit" in the conventional MD, and the disk is driven at CLV (constant linear velocity) which is 1.2 m/s.

The standard data rate for recording and playback is 133 kB/s, and the recording capacity is 164 MB (140 MB in MD-DATA). Also, data is rewritten in minimum units (cluster) of 36 sectors including 32 main sectors and 4 link sectors.

Next, the present invention will be described concerning the next-generation MD1. The next-generation MD1 is identical in physical specifications of the recording medium to the aforementioned conventional MD. Therefore, the track pitch is 1.6 µm, laser wavelength λ is λ=780 nm, and the numerical aperture (NA) of the optical pickup head is NA=0.45. The recording method adopted is the groove-recording. The addressing method uses ADIP. Thus, since the next-generation MD1 is similar in construction, ADIP addressing and servo control in the optical system to the conventional MD, it is interchangeable with the conventional MD.

To modulate data to be recorded, the next-generation MD1 adopts the RLL (1-7) PP modulation method (RLL stands for "run length limited"; PP stands for "parity preserve/prohibit rmtr (=repeated minimum transition runlength)") which is suitable for high-density recording. Also, to correct error, the next-generation MD1 uses the RS-LDC (Reed-Solomon—long distance code) with BIS (burst indicator subcode) which shows a high capability of error correction.

Figure 12:
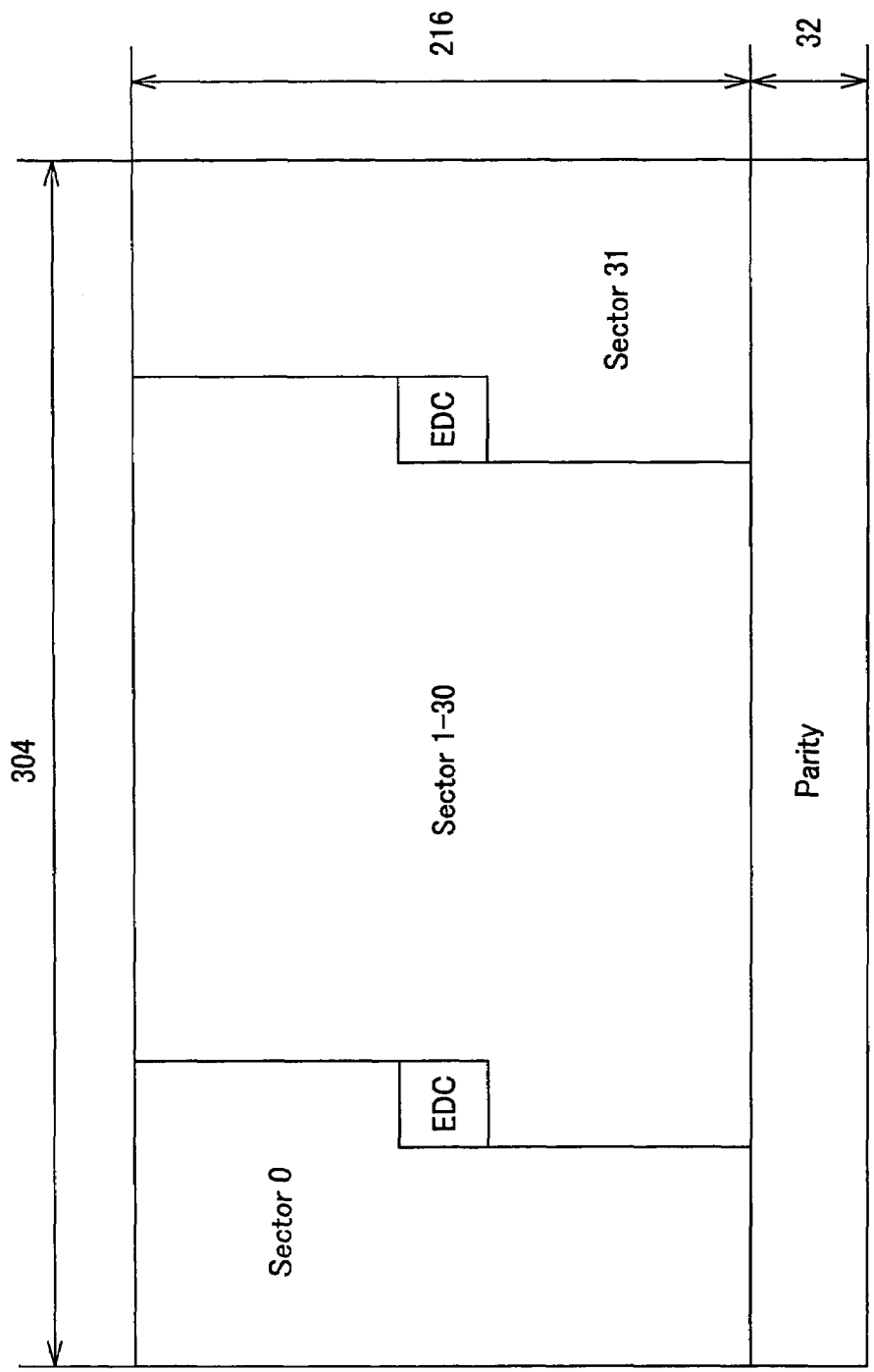
FIG. 12 shows a data block configuration including BIS of the next-generation mini disks MD1 and MD2.
Figure 13:
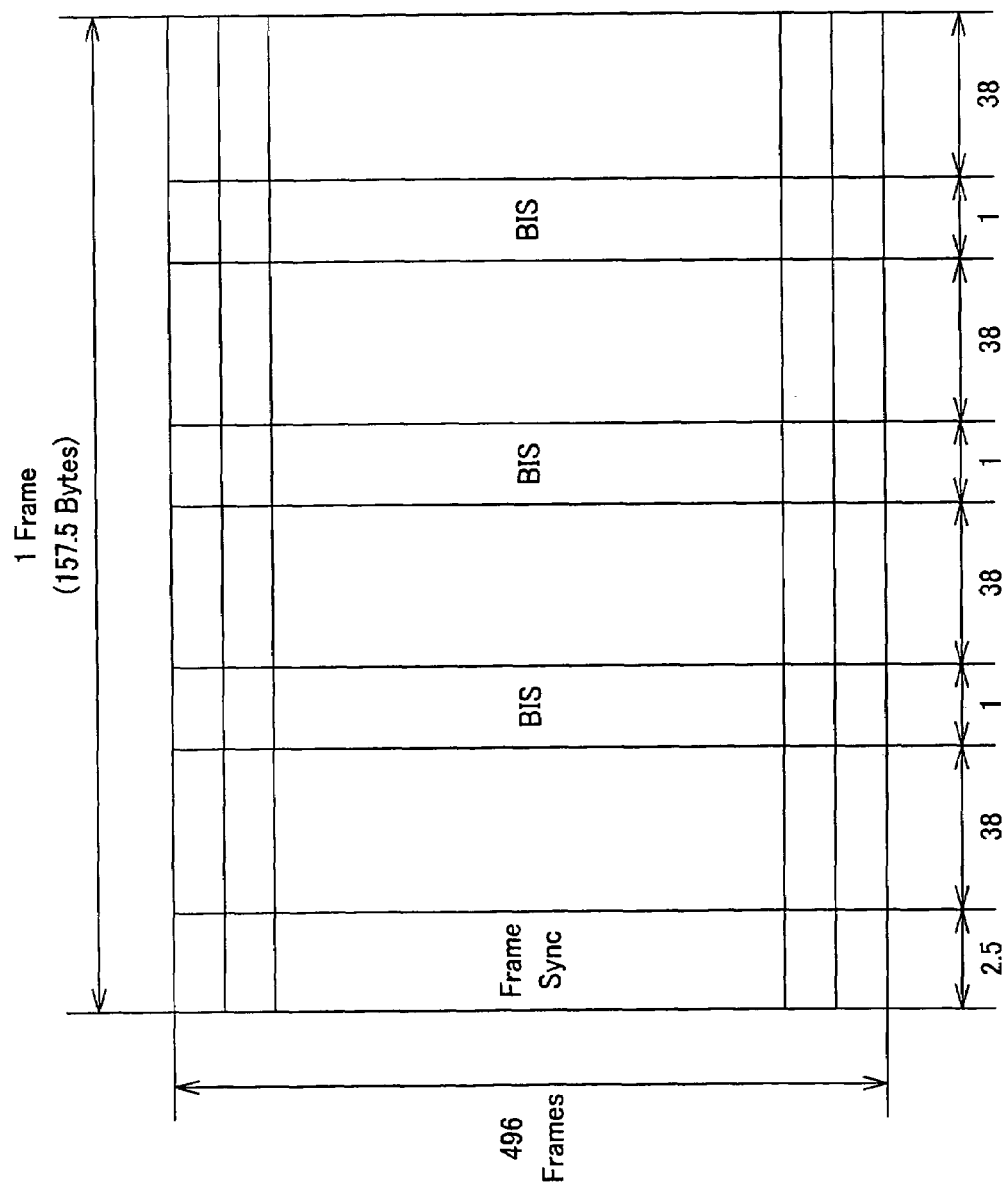
FIG. 13 shows the ECC format for the data blocks in the next-generation mini disks MD1 and MD2.

More particularly, 2,052 bytes including user data of 2,048 bytes supplied from a host application or the like and EDC (error detection code) of four bytes added to the former are taken as one sector (data sector, different from a physical sector in the disk, which will further be described later), and 32 sectors including Sector 0 to Sector 31 are arranged as a block having a structure of 304 row by 216 lines as shown in FIG. 12. The 2,052 bytes in each sector are scrambled to make exclusive OR (Ex-OR) with a predetermined pseudo-random number. A parity of 32 bytes is added to each row in the scrambled block to form an LDC (long distance code) block having a structure of 304 rows by 248 lines. This LDC block is interleaved to provide an interleaved LDC block having a form of 152 rows by 496 lines. Further, 38 rows and one row of BIS are alternately arranged to provide a structure of 155 rows by 496 lines as shown in FIG. 13. Moreover, a frame sync code (Frame Sync) of 2.5 bytes is added to the top of the above structure for one line to correspond to one frame, thereby providing a structure of 157.5 bytes by 496 frames. Thus, each line in FIG. 13 corresponds to 496 frames including Frame 10 to Frame 505 in data area in one recording block (cluster) which will further be described later with reference to FIG. 19.

In the above data structure, data is interleaved in each block, whereby the data redundancy will be 20.50%. Also, data is detected using the Viterbi decoding based on PR (1, 2, 1) ML.

The disk is drive at a CLV (constant linear velocity) which is 2.4 m/s. The standard data rate during recording and playback is 4.4 Mbytes/s. By using this CLV driving, the disk can be made to have a total recording capacity of 300 Mbytes. With the use of the RLL (1-7) PP instead of EFM (eight-fourteen modulation), the window margin can be increased from 0.5 to 0.666 such that a 1.33 times higher density of recording can be attained. Also, a cluster being a minimum unit for data rewrite is composed of 16 sectors (64 kbytes). With the use of the RS-LDC method with BIS, not the CIRC method, and the above-mentioned sector structure and Viterbi decoding, the data to be recorded can be modulated with an efficiency of 79.5% improved from 53.7% and a 1.48 times higher density.

With the above taken together, the next-generation MD1 can have a recording density of 300 Mbytes which is about double that of the conventional MD.

On the other hand, the next-generation MD2 is a recording medium having applied thereto a high-density recording technique such as the magnetic domain wall displacement detection (DWDD) technique, and it is different in physical format from the aforementioned conventional MD and next-generation MD1. In the next-generation MD2, the track pitch is 1.25 µm and bit length is 0.16 µm/bit. Say, the next-generation MD2 is highly densified linearly.

For interchangeability between the conventional MD and next-generation MD1, the optical system, read method and servo operations are made to comply with the conventional standards, the laser wavelength λ is λ=780 nm and numerical aperture (NA) of the optical system is NA=0.45. The recording method is a groove-recording, and addressing method uses ADIP. Also, the casing shape is the same as that of the conventional MD and next-generation MD1.

For reading data recorded with a smaller track pitch and linear density (bit length) than those in the conventional disk as above by an optical disk equivalent to those used for the conventional MD and next-generation MD1, however, it is necessary to eliminate constraints on detrack margin, cross talk from land and groove, cross talk from wobble, outfocus, CT signal, etc. To this end, the next-generation MD2 has a groove depth, inclination, width, etc. different from those in the conventional MD and next-generation MD1. More specifically, the groove is designed 160 to 180 nm deep, 60 to 70 deg. in inclination and 600 to 800 nm wide.

Also, to modulate data to be recorded, the next-generation MD2 adopts the RLL (1-7) PP modulation method (RLL stands for "run length limited"; PP stands for "parity preserve/prohibit rmtr (=repeated minimum transition runlength)") which is suitable for high-density recording. Also, to correct error, the next-generation MD2 uses the RS-LDC (Reed-Solomon—long distance code) with BIS (burst indicator subcode) which shows a high capability of error correction.

Data is interleaved in each block, whereby the data redundancy will be 20.50%. Also, data is detected using the Viterbi decoding based on PR (1, −1) ML. Also, a cluster being a minimum for data rewriting is composed of 16 sectors (64 kbytes).

The disk is drive at a ZCAV (zonal constant angular velocity) which is 2.0 m/s. The standard data rate during recording and playback is 9.8 Mbytes/s. By using DWDD and this ZCAV driving, the next-generation MD2 can be made to have a total recording capacity of 1 Gbytes.

Figure 14:
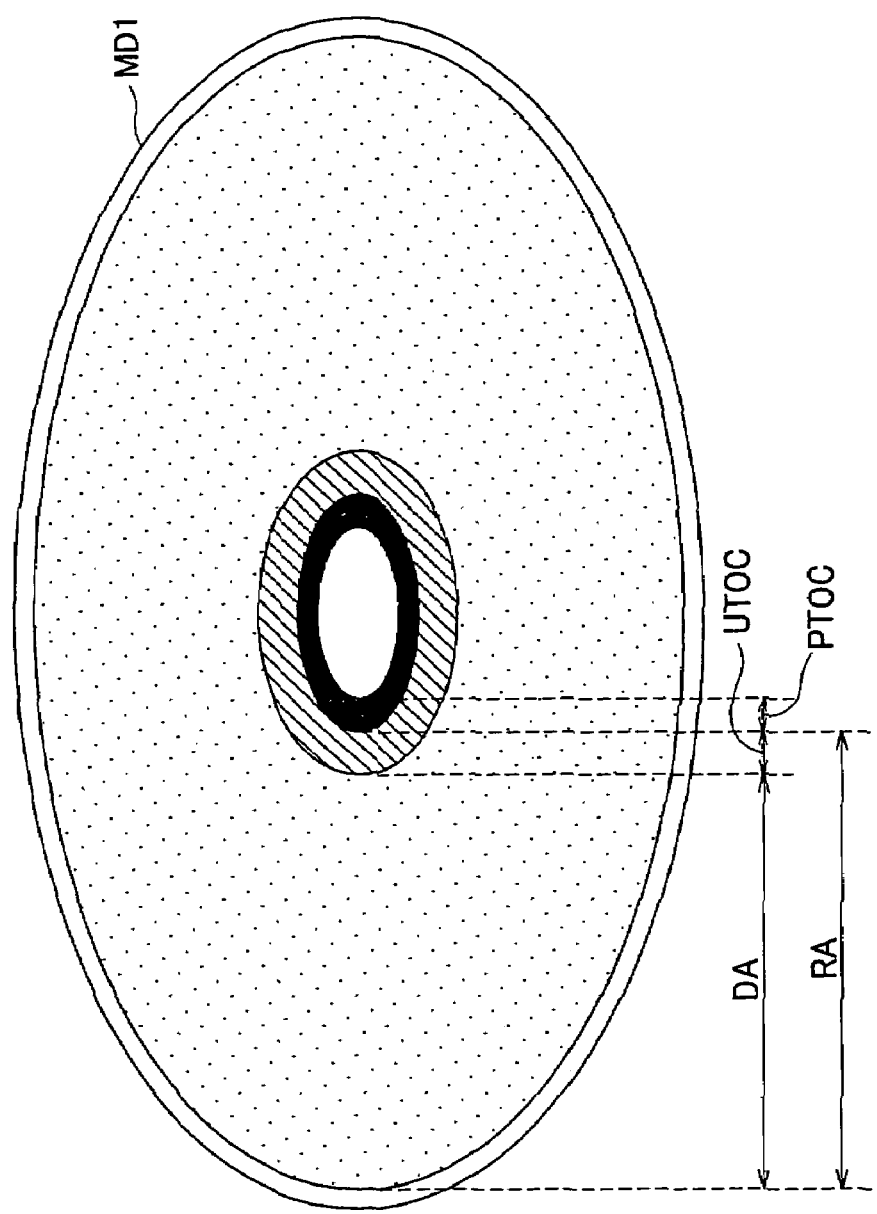
FIG. 14 schematically illustrates an example of the area structure over the next-generation mini disk MD1.

An example of the area structure on the next-generation MD1 according to the present invention is schematically illustrated in FIG. 14. The next-generation MD1 is the same recording medium as the conventional MD and has PTOC (premastered table of contents) as a premastered area PE along the innermost circumference thereof. In the PTOC, there is recorded disk management information as embossed pits formed by a physical structure changing.

Outside the premastered area PE, there is provided a magneto-optically recordable area RA. Namely, data can be written to or read from this recordable area RA where there is formed a groove for guiding a recording track. A UTOC (user table of contents) area is provided along the innermost circumference of the recordable area RA, in which UTOC information is stated and there are provided a relief area against the premastered area PE and a power calibration area used for adjustment of the laser light output power or the like.

Note that in the recordable area RA, the area outside UTOC is taken as a data-recordable area DA.

Figure 15:
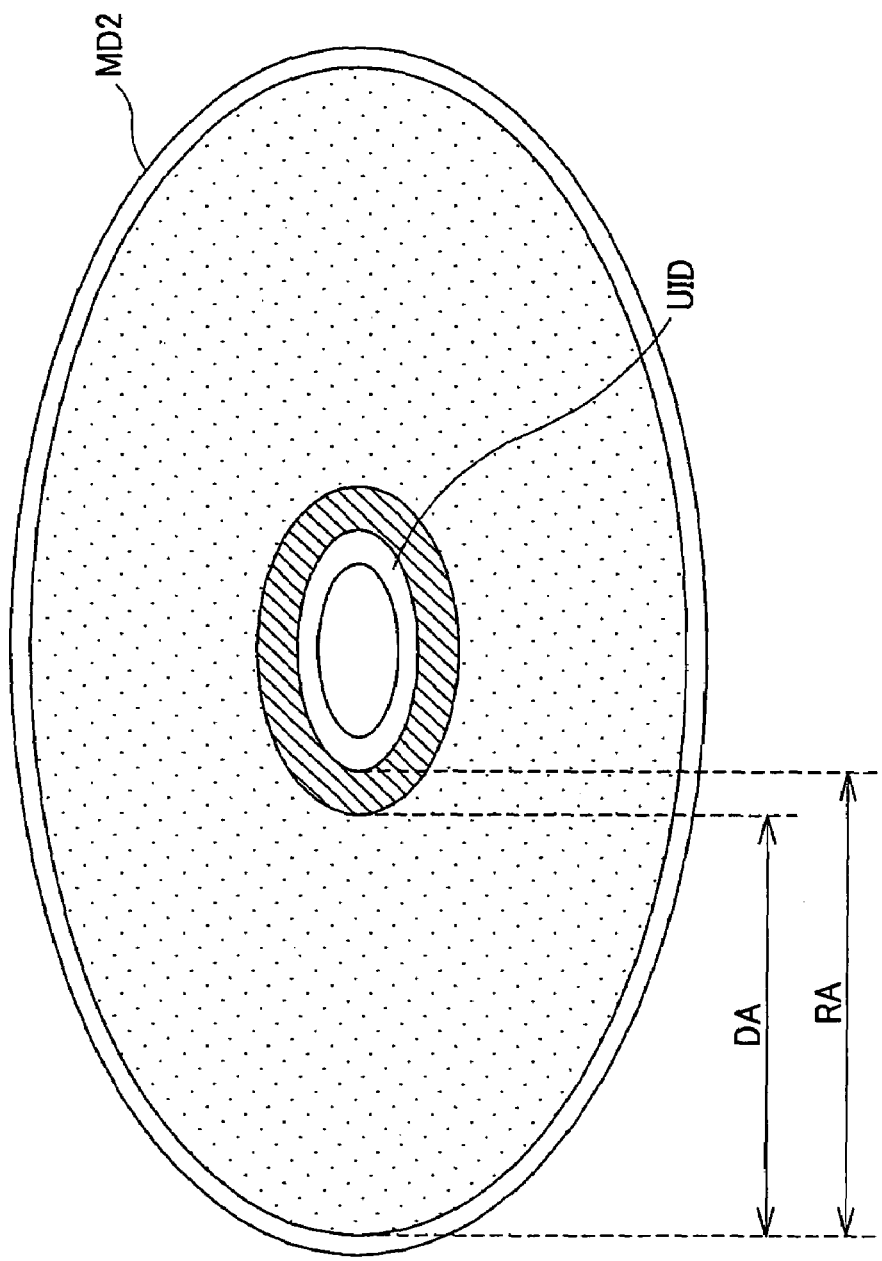
FIG. 15 schematically illustrates an example of the area structure over the next-generation mini disk MD2.

As shown in FIG. 15, the next-generation MD2 uses no preformed pits for a higher-density recording but has given the design thereof such a consideration that PTOC-equivalent information for the next-generation MD2 is written by wobbling the groove. For example, the next-generation MD2 has provided inside the recordable area RA a unique ID area (UID) to which there are recorded information for copyright protection, information for checking data falsification, other information not to be disclosed, etc. Information is recorded to the UID area by a different recording method the DWDD method applied to the next-generation MD2.

Note that also in the next-generation MD2, the area outside the recordable area RA is taken as a data recordable area DA.

Note that in the next-generation mini disks MD1 and MD2, there can be recorded together both an audio track for music data and a data track. In this case, there are formed in arbitrary positions in the data area DA, as shown in FIG. 16, an audio recording area AA where at least one audio track is recorded and a PC data recording area DDA where at least one data track is recorded.

Figure 16:
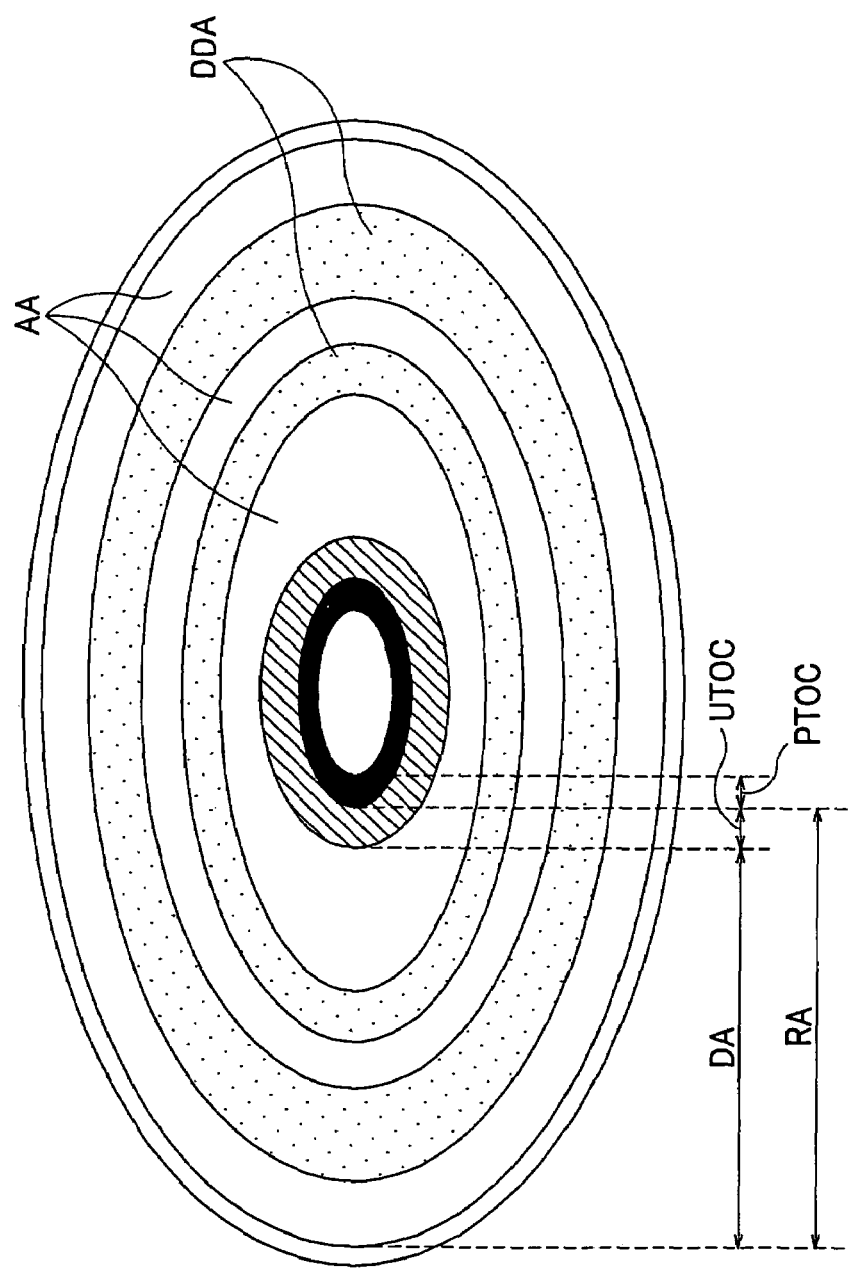
FIG. 16 shows an example of the area structure enabling to record audio track and data track for music data together to the next-generation mini disks MD1 and MD2.

A series of audio tracks or data tracks may not necessarily be recorded physically continuously on the disk but it may be recorded as a plurality of divided parts thereof as shown in FIG. 16. Each part is a section recorded physically continuously. Say, even in case two PC data recording areas DDA physically apart from each other as shown in FIG. 16, the number of data tracks is singular or plural as the case may be. FIG. 16 shows the physical specifications of the next-generation MD1. Also in the next-generation MD2, there can be provided together such an audio recording area AA and PC data recording area DDA.

A concrete example of a disk player/recorder compatible with the next-generation MD1 and MD2 having the aforementioned physical specifications will be described in detail later.

2. Data Management System for the Disk

Figure 17:
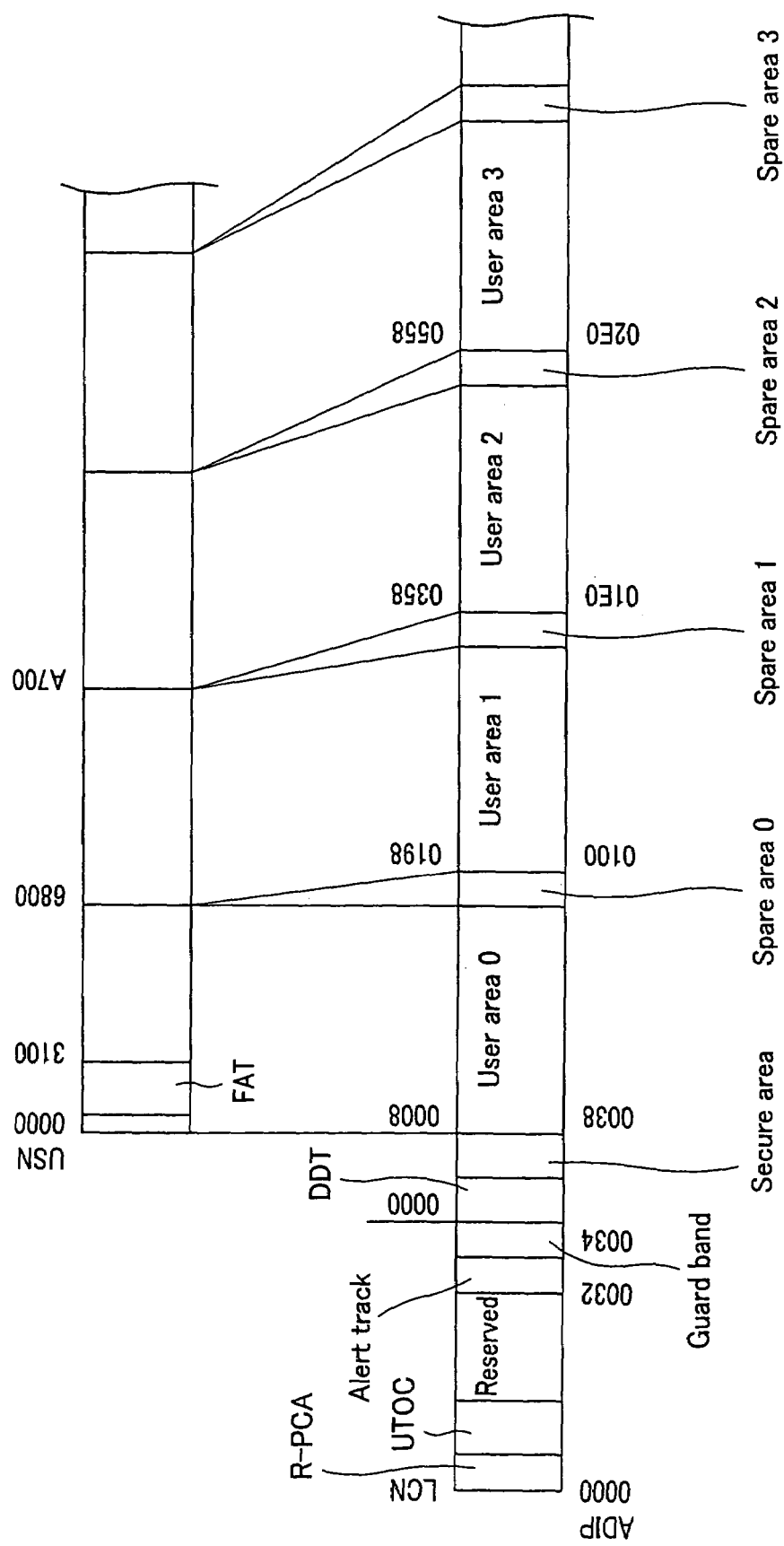
FIG. 17 shows a data management structure of the next-generation mini disk MD1.
Figure 18:
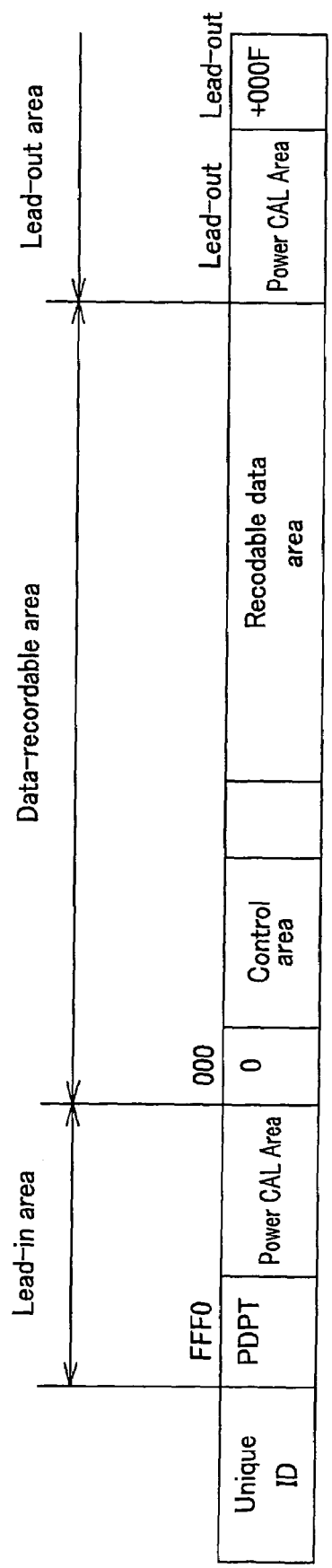
FIG. 18 shows a data management structure of the next-generation mini disk MD2.

The data management systems for these embodiments of the magneto-optical disk will be described herebelow with reference to FIGS. 17 and 18. FIG. 17 shows the data management system for the next-generation MD1, and FIG. 18 shows that for the next-generation MD2.

Since the next-generation MD1 is the same recording medium as the conventional MD, it has recorded therein PTOC by unrewritable embossed pits as in the conventional MD. The TPOC includes, as management information, total capacity of the disk, position of UTOC in UTOC area, position of power calibration area, start position of data area, end position of data area (lead-out position), etc.

In the next-generation MD1, a power calibration area (Rec Power Calibration Area) for adjustment of laser write output are provided at ADIP addresses 0000 and 0002. At next addresses 0003 to 0005, UTOC is recorded. The UTOC includes management information rewritable correspondingly to write, delete or the like of a recording track, that is, audio track/data track, and which manages each track and a start position, end position, etc. of parts forming the track. The management information also manages a free area of the data area where no track is yet recorded, that is, a part of the writable area. In the UTOC, the entire PC date is managed as one track not formed by any MD audio data. Thus, even when an audio track and data track are recorded together, positions of a plurality of parts of a PC data can be managed.

Also, UTOC data is recorded in a specific ADIP cluster in the UTOC area, and the UTOC data has the content thereof defined for each of sectors in the ADIP cluster. More specifically, UTOC sector 0, that is, top ADIP sector in the ADIP cluster, manages parts corresponding to a track and free area, and UTOC sectors 1 and 4 manage character information corresponding to the tracks. Also, information for management of recording data corresponding to a track is written to UTOC sector 2.

The UTOC sector 0 is a data area having recorded therein recorded data, recordable unrecorded areas and data management information or the like. For example, for recording data to the disk, the disk drive will search for an unrecorded area in the disk on the base of the UTOC sector 0 and record data to the unrecorded area. Also, for playing back the disk, the disk drive will find an area where data track to read is recorded on the basis of the UTOC sector 0 and access that area for reading the data there.

Note that in the next-generation MD1, PTOC and UTOC are recorded as data modulated by the modulation method matching the conventional mini disk system, say, the EFM modulation method. Therefore, the next-generation MD1 will have an area having recorded therein data modulated by the EFM modulation method and an area having recorded therein data modulated by the RS-LDC and RLL (1-7) PP modulation methods as high-density data.

An alert track stated in an ADIP address 0032 has stored therein information for alerting, when the next-generation MD1 is inserted into a disk drive for the conventional MD, that the medium is not supported by the disk drive for the conventional MD. The information may be voice or warning sound data such as "This disk has a recording format not supported by the player". Also, in case the disk drive is provided with a display, the information may be data warning the fact. The alert track is recorded by the EFM modulation method to be readable by the disk drive for the conventional MD.

At an ADIP address 0034, there is recorded disk description table (DDT) listing disk information on the next-generation MD1. In the DDT, there are stated a format type, total number of intra-disk logical clusters, ID unique to a medium, update information on the DDT, information on bad clusters, etc.

Since the above information are recorded as high-density data modulated by the RS-LDC and RLL (1-7) PP modulation methods starting at the DDT area, a guard band is provided between the alert area and DDT.

Also, to the lowest-number ADIP address where high-density data modulated by the RLL (1-7) PP modulation method, that is, to the top address of DDT, there is added a logical cluster number (LCN) which is 0000 at the DDT top address. One logical cluster is of 65,536 bytes and a logical cluster is a minimum unit for read and write. It should be noted that ADIP addresses 0006 to 0031 are reserved.

At next ADIP addresses 0036 to 0038, there is provided a Secure Area which is disclosable when authentication is obtained. The secure area is used to manage the attribute such as disclosability or nondisclosability of each of clusters forming a data. Especially, information for copyright protection, information for checking data falsification, etc. are recorded in the secure area. Also, other various kinds of nondisclosable information can be recorded in the secure area. Only a specific external apparatus especially authorized can have limited access to this nondisclosable area, and information for authentication of the external apparatus authorized for the access is also included in the information recorded in the secure area.

Starting at the ADIP address 0038, there are stated a freely writable and readable User Area (arbitrary data length) and a Spare Area (data length 8). Data recorded in the user area is divided into User Sectors each of 2,048 bytes from the top when the data is laid in an ascending order of the LCN, and an external apparatus such as PC assigns a user sector number (USN) to each of the user sectors first with "0000" to the top one of them. Thus the user sectors are managed by a FAT file system.

Next, the data management structure of the next-generation MD2 will be explained with reference to FIG. 18. The next-generation MD2 has no PTOC area provided therein. Therefore, disk management information such as a total capacity of the disk, position of the power calibration area, start position of the data area, end position (lead-out position) of the data area, etc. is recorded being entirely included as PDPT (preformat disk parameter table) in the ADIP information. The data is modulated by the RS-LDC with BIS and RLL (1-7) PP modulation methods and recorded by the DWDD method.

Also, in each of the lead-in and lead-out areas, there is provided a laser power calibration area (PCA). In the next-generation MD2, an LCN is assigned to the PCA area first with "0000" to an ADIP address next to PCA.

Further, the next-generation MD2 has provided therein a control area corresponding to the UTOC area in the next-generation MD1. FIG. 18 shows a unique ID area (UID) where information for copyright protection, information for checking data falsification and other non-disclosable information are to be recorded. Actually, however, the UID area is recorded inside the lead-in area by a different recording method from the ordinary DWDD method.

Files in both the next-generation MD1 and MD2 are managed according to the FAT file system. For example, each data track has a FAT file system unique to itself. Alternately, one FAT file system may be recorded over a plurality of data tracks.

3. ADIP Sector/Cluster Structure, and Data Block

Next, the relation between the sector structure and data block in the next-generation MD1 and MD2 according to the present invention will be described with reference to FIG. 19. The conventional MD system uses a cluster/sector structure corresponding to physical addresses recorded as ADIP. In the description of the embodiments of the present invention, however, a cluster based on the ADIP address based on the ADIP address will be referred to as "ADIP cluster" for the convenience of the explanation. Also, a cluster based on an address in the next-generation MD1 and MD2 will be referred to as "recording block" or "next-generation MD cluster".

Figure 19:
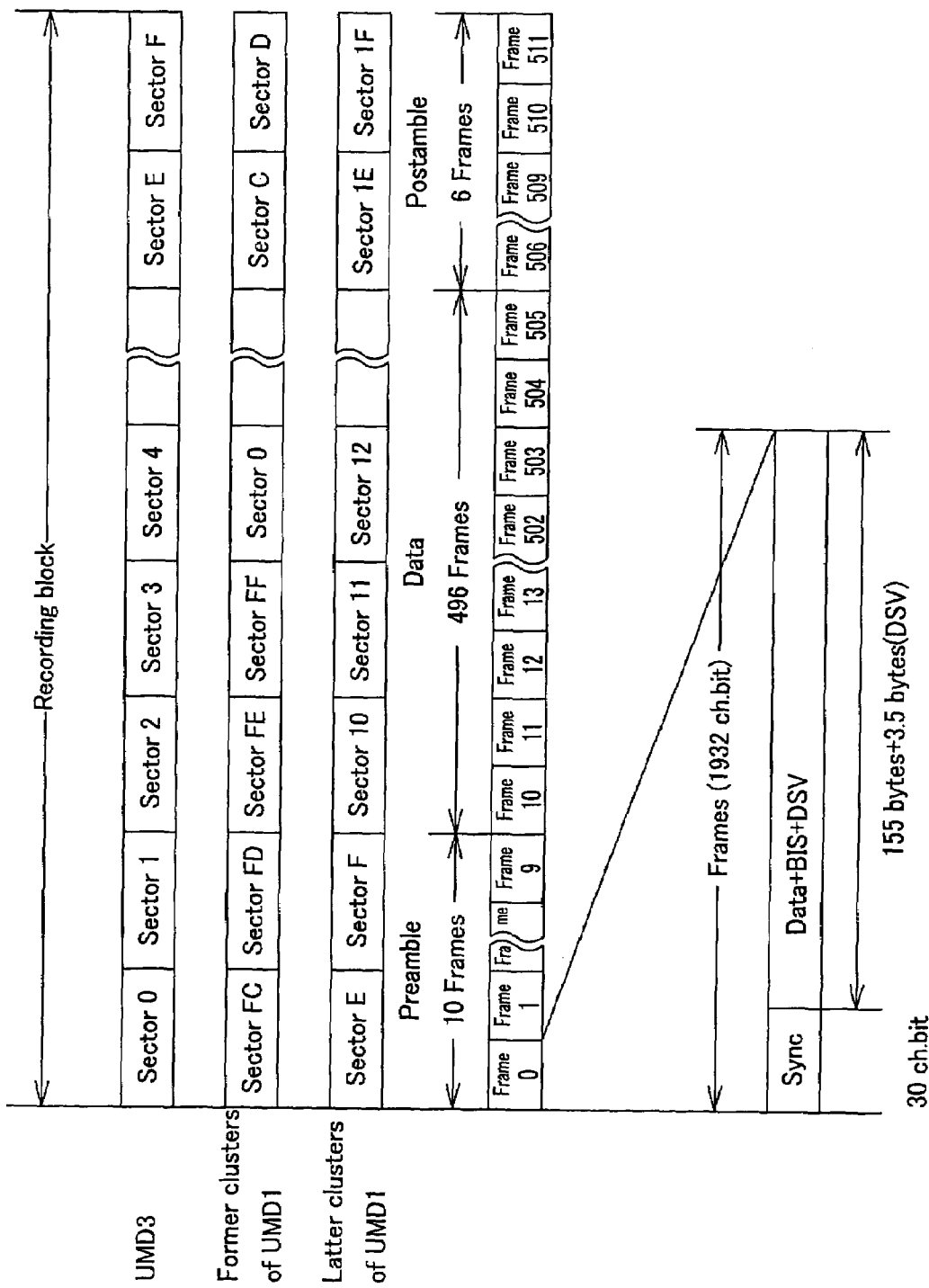
FIG. 19 shows the relation in ADIP sector structure and data block between the next-generation mini disks MD1 and MD2.

In the next-generation MD1 and MD2, the data track is manipulated as a data stream formed from a series of clusters each as a minimum unit of address as shown in FIG. 19, and one recording block (first-generation MD cluster) is composed of 16 sectors or a half of an ADIP cluster as shown in FIG. 19.

As shown in FIG. 19, data is one recording block (first-generation MD cluster) has 512 frames including 10 frames of a preamble, 6 frames of a postamble, and 496 frames of a data part. Further, one frame in the recording block consists of a sync signal area, data, BIS and DSV.

Also, of the 512 frames in one recording block, the 496 frames where significant data are recorded are equally divided by 16, and each division of 31 frames will be called "address unit". The number for the address unit will be called "address unit number (AUN)". The AUN is a number assigned to each of the address units and used for address management of recorded signals.

In case high-density data modulated by the 1-7 PP modulation method is recorded to a conventional MD having a physical cluster/sector structure stated in ADIP as in the next-generation MD1, there will take place a problem that the ADIP address originally recorded in the disk will not coincide with the address of an actually recorded data block. Random access is made with reference to the ADIP address. Data can be read even by random access to near a position where a desired data is recorded. For data write, however, access has to be made to an accurate position where data to be written will not be written over any existent data. On this account, it is important to accurately detect a position to access from a next-generation MD cluster/sector made to corresponding to the ADIP address.

To this end, in case of the next-generation MD1, ADIP address recorded as a wobble on the medium surface is converted under a predetermined rule to provide a data unit from which a high-density data cluster is detected. In this case, the high-density data cluster is formed from an integer multiple of ADIP sectors. When stating, based on this concept, a next-generation cluster in one ADIP cluster recorded in the conventional MD, each next-generation MD cluster is made to correspond to a half of ADIP cluster.

Therefore, in the next-generation MD1, a half of the conventional MD cluster is made to correspond to a minimum unit of recording block (Recording Block).

On the other hand, in the next-generation MD2, one cluster is manipulated as one recording block.

Note that in the above embodiments, a data block of 2,048 bytes supplied from the host application as having previously been described are taken as one logical data sector (LDS). At this time, a set of 32 logical data sectors recorded into the same recording block is taken as a logical data cluster (LDC).

Because of the data structure having been described above, well-timed recording is possible to the medium when recording next-generation MD data to an arbitrary position. Also, by including an integer number of next-generation MD clusters in the ADIP cluster which is an ADIP address unit, it is possible to simplify the rule on address conversion from an ADIP cluster address to a next-generation MD data cluster and also the conversion circuit or software configuration.

Note that FIG. 19 shows an example correspondence made of two next-generation MD clusters to one ADIP cluster but three or more next-generation MD clusters may be made to correspond to one ADIP cluster. At this time, one of the next-generation MD clusters may not be composed of 16 ADIP clusters but the next-generation MD cluster may be configured correspondingly to a difference in data recording density between the EFM modulation method and RLL (1-7)

PP modulation method, number of sectors forming together the next-generation MD sector, size of one sector, etc.

Next, the ADIP data structure will be described with reference to FIG. 20. FIG. 20A shows an ADIP data structure in the next-generation MD2, while FIG. 20B shows an ADIP data structure in the next-generation MD1.

In the next-generation MD1, there are stated a sync signal (Sync), cluster H information (Cluster H) and cluster L information (Cluster L), indicating cluster numbers and the like in the disk, and sector information (Sector) including sector numbers and the like in the sectors. The sync signal (Sync) is stated with 4 bits, cluster H information (Cluster H) is with upper 8 bits of the address information, cluster L information (Cluster L) is with lower 8 bits of the address information, and the sector information (Sector) is with 4 bits. Also, the latter 14 bits have CRC added thereto. Namely, ADIP signal of 42 bits is recorded to the header of each ADIP sector.

Also, in the next-generation MD2, there are stated sync signal data of 4 bits, cluster H information (Cluster H) of 4 bits, cluster M information (Cluster M) of 8 bits, cluster L information (Cluster L) of 4 bits, and sector information (Sector) of 4 bits. The latter 18 bits have BCH parity (Parity) added thereto. Also in the next-generation MD2, a 42-bit ADIP signal is recorded in the header of each ADIP sector.

In the ADIP data structure, the above cluster H information (Cluster H), cluster M information (cluster M) and cluster L information (Cluster L) mat freely be composed. Also, other additional information may be stated in the above ADIP data structure. As shown in FIG. 21 for example, in the ADIP signal for the next-generation MD2, the cluster information may be represented by the Cluster H of upper 8 bits and Cluster L of lower 8 bits and disk control information may be stated in place of the Cluster L represented by the lower 8 bits. The disk control information includes a correction value of servo signal, upper-limit value of playback laser power, correction factor of playback laser power linear velocity, upper-limit value of recording laser power, correction factor of recording laser power linear velocity, recording magnetic sensitivity, phase difference between magnetism and laser pulse, parity and the like.

4. Disk Drive

An example of the disk drive compatible with the next-generation MD1 and MD2 will be described herebelow with reference to FIGS. 22 and 23. The disk drive is generally indicated with a reference 10. The disk drive 10 is connectable to a personal computer (will be referred to simply as "PC" hereunder) 70 and can use the next-generation MD1 and MD2 as a storage of audio data, and as an external storage for the PC 70 or the like.

As shown, the disk drive 10 includes a medium drive 11, memory transfer controller 12, cluster buffer memory 13, auxiliary memory 14, USB interfaces 15 and 16, USB hub 17, system controller 18, and an audio processor 19.

The medium drive block 11 makes recording to and/or playback of a loaded disk 90 such as a conventional MD, next-generation MD1 or MD2. The medium drive 11 is internally constructed as will be described in detail later with reference to FIG. 23.

The memory transfer controller 12 is provided to control transfer of data read from the medium drive 11 and of data to be recorded to the medium drive 11. The cluster buffer memory 13 is controlled by the memory transfer controller 12 to buffer data read in units of a high-density data cluster by the medium drive 11 from a data track in the disk 90. The auxiliary memory 14 is controlled by the memory transfer controller 12 to store a variety of management information such as UTOC data, CAT data, unique ID, hash value and the like and special information read by the medium drive 11 from the disk 90.

The system controller 18 is enabled to make communications with the PC (personal computer) 70 connected thereto via the USB interface 16 and USB hub 17. Thus, the system controller 18 controls communications with the PC 70 to receive a command such as write request, read request or the like and send status information and other necessary information, and also controls the entire disk drive 10.

For example, when the disk 90 is loaded in the medium drive 11, the system controller 18 instructs the medium drive 11 to read management information or the like from the disk 90, and the auxiliary memory 14 to store management information such as PTOC, UTOC, etc. and the like read by the memory transfer controller 12.

By reading the above management information, the system controller 18 can detect the track status of recording in the disk 90. Also, by reading CAT data, the system controller 18 can know the high-density data cluster structure in the data track and respond to a request for access from the PC 70 to the data track. Also, the system controller 18 can perform disk authentication or other operation on the basis of unique ID and hash value, and send such values to the PC 70 and have the PC 70 to perform the disk authentication or other operation. Upon reception of a request for reading a FAT sector from the PC 70, the system controller 18 gives the medium drive 11 a command for reading a high-density data cluster including the FAT cluster. The high-density data cluster thus read is written by the memory transformer controller 12 into the cluster buffer memory 13. However, in case the FAT sector data is already stored in the cluster buffer memory 13, the medium drive 11 has not to read the high-density data cluster. At this time, the system controller 18 provides a command for reading the required FAT sector data from high-density data cluster data written n the cluster buffer memory 13, and makes a control to send the command to the PC 70 via the USB interface 15 and USB hub 17.

Also, when the system controller 18 receives a request for writing a FAT sector from the PC 70 to write a FAT sector, it causes the medium d rive 11 to read a high-density data cluster including the FAT sector. The high-density data cluster thus read is written by the memory transfer controller 12 into the cluster buffer memory 13. However, in case the FAT sector data is already stored in the cluster buffer memory 13, the medium drive 11 has not to read the high-density data cluster.

Also, the system controller 18 supplies the FAT sector data (data to be recorded) received from the PC 70 to the memory transfer controller 12 via the USB interface 15, and causes the memory transfer controller 12 to rewrite the corresponding FAT sector data in the cluster buffer memory 13.

Further, the system controller 18 instructs the memory transfer controller 12 to transfer, as data to be recorded, data in the high-density data cluster stored in the cluster buffer memory 13 and including a necessary FAT sector in a rewritten state to the medium drive 11. At this time, the medium drive 11 adopts the EFM modulation method when the loaded medium is a conventional MD, or the RLL (1-7) PP modulation method when the medium is the next-generation MD1 or MD2, to modulate the data to be recorded in the high-density data cluster for recording to the medium.

Note that in the disk drive 10, the recording and playback control is done when writing or reading a data track. When writing or reading MD audio data to or from the audio track, data is transferred via the audio processor 19.

The audio processor 19 has an input system including an analog audio signal input block such as a line input circuit/microphone input circuit for example, A-D converter, and a digital audio data input block. Also, the audio processor 19 includes an ATRAC compression encoder/decoder and a compressed data buffer memory. Further, the audio compressor 19 has an output system including a digital audio data output block, D-A converter, and an analog audio signal output block such as a line output circuit/headphone output circuit.

Audio data is recorded to the disk 90 when the audio processor 19 is supplied with digital audio data or analog audio signal. After the audio processor 19 is supplied with linear PCM digital audio data or analog audio signal, the linear PCM audio data resulted from modulation in the A-D converter undergoes ATRAC compression encoding, and then stored in the buffer memory. Thereafter, the data is read from the buffer memory at a predetermined time in units of data corresponding to ADIP cluster, and transferred to the medium drive 11.

The medium drive 11 modulates the received compressed data by the EFM modulation method or RLL (1-7) PP modulation method and writes the data as an audio track to the disk 90.

When reading an audio track from the disk 90, the medium drive 11 demodulates the read data to an ATRAC-compressed data state, and transfers the data to the audio processor 19. The audio processor 19 will make ATRAC decompression of the data to provide linear PCM audio data, and deliver the data at the digital audio data output block. Alternately, the audio processor 19 converts the read data by the D-A converter into analog audio signal, and delivers the analog audio signal at the line output/headphone output block.

Figure 22:
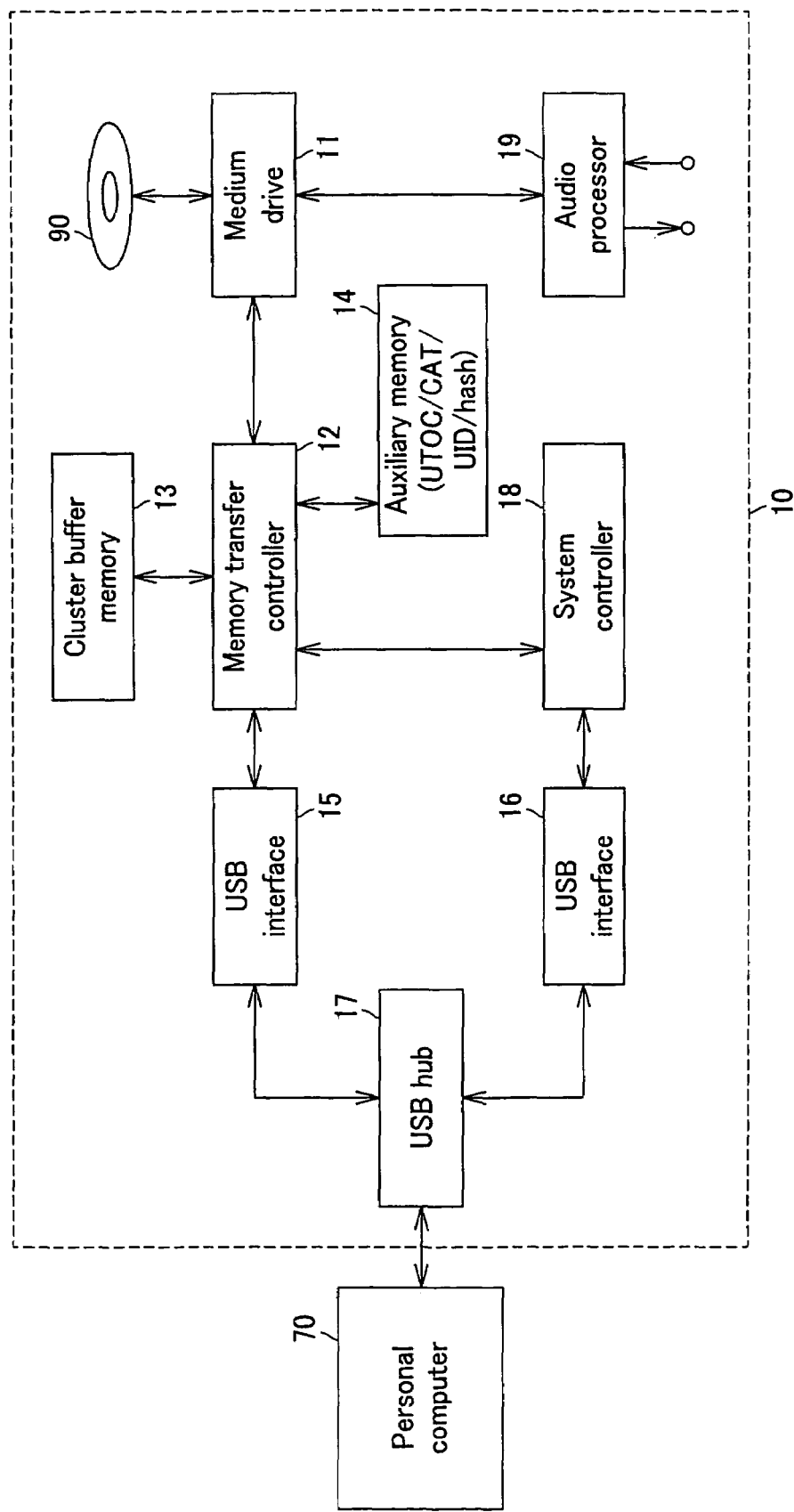
FIG. 22 is a block diagram of a disk drive.
Figure 23:
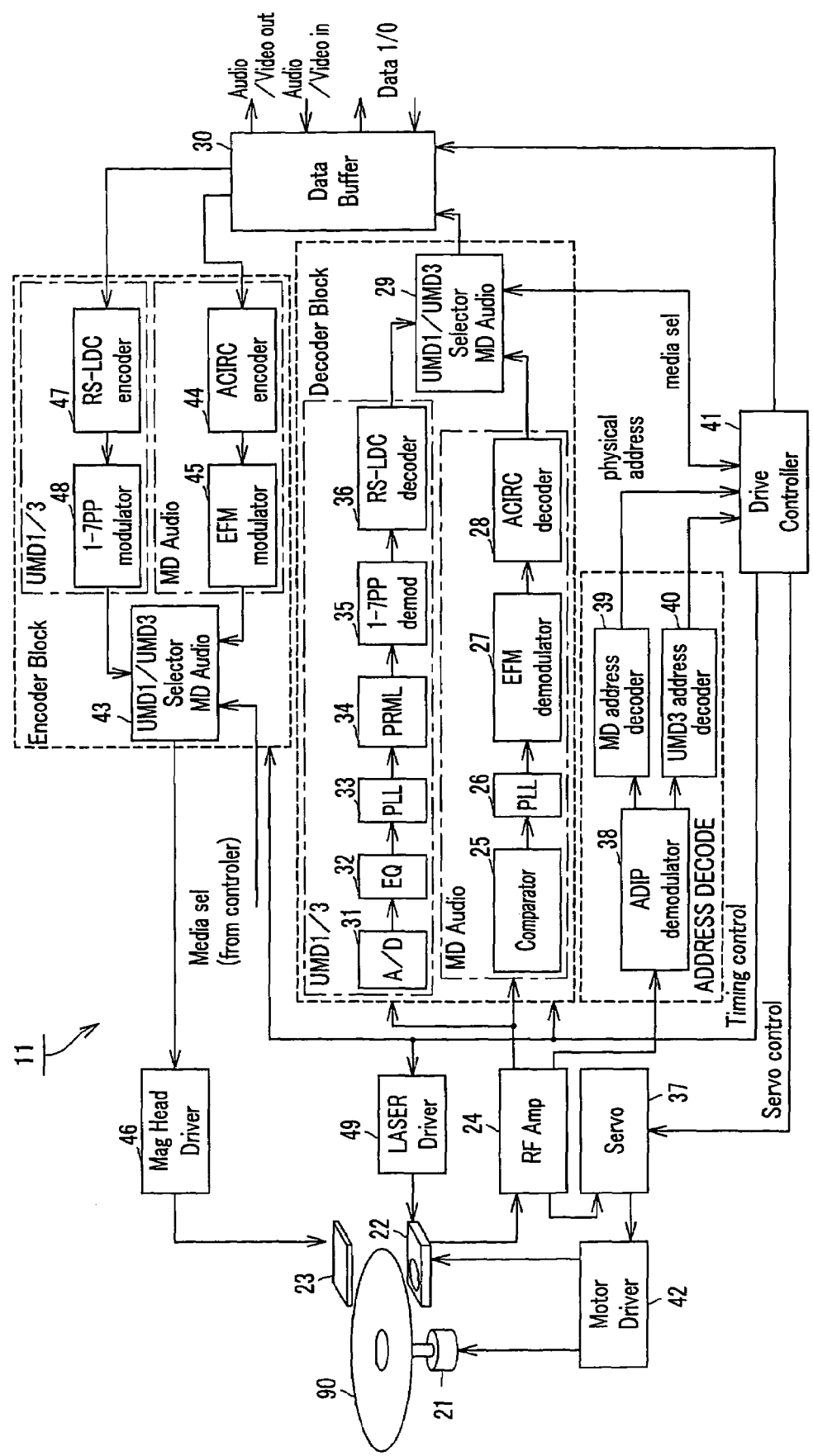
FIG. 23 is a block diagram showing the internal construction of a medium drive.

Note that the construction shown in FIG. 22 is just an example. For example, in case the disk drive 10 is connected to the PC 70 and used as an external storage intended for writing and reading only a data track, the audio processor 19 is unnecessary. On the other hand, when it is primarily intended to write and read audio signal, it is preferable that the audio processor 19 should be provided and also a user's control unit and display unit be provided as user interfaces. Also, the disk drive 10 may be connected to the PC 70 via USB or a so-called IEEE 1394 interface complying with IEEE (the Institute of Electrical a Engineers, Inc.) Standard or a general-purpose connection interface.

Next, the construction of the medium drive 11 to make recording to and/or play back the conventional MD, next-generation MD1 and MD2 will be described in further detail below with reference to FIG. 23.

The medium drive 11 is characterized in that to make data write to the conventional MD, next-generation MD1 and MD2, it has a recording system to make EFM modulation and ACIRC encoding for the recording to the conventional MD and also a recording system to make RLL (1-7) PP modulation and RS-LDC encoding for the recording to the next-generation MD1 and MD2. The medium drive 11 is also characterized in that to make data read from the conventional MD, next-generation MD1 and MD2, it has a playback system to make EFM demodulation and ACIRC decoding for playback of the conventional MD and also a playback system to make RLL (1-7) demodulation and RS-LDC decoding based on the data detection using the PR (1, 2, 1) ML and Viterbi decoding for playback of the next-generation MD1 and MD2.

In the medium drive 11, the loaded disk 90 is driven to rotate by a spindle motor 21 at a CLV or ZCAV. For recording or playback, a laser light is projected from an optical pickup 22 to the disk 90.

To make recording to the disk 90, the optical pickup head 22 emits a laser light having a high level for heating a recording track to a Curie point. Also, to play back the disk 90, the optical pickup head 22 emits a laser light for detecting a return light from the disk under the magnetic Kerr effect. In this case, however, the reading laser light has a relatively low level. For this laser emission, the optical pickup head 22 has an optical system including a laser diode as a laser source, polarized beam splitter, objective lens, etc. and a photodetector to detect a return light from the disk. The objective lens provided in the optical pickup head 22 is held to be movable radially of the disk and toward and away from the disk by a bi-axial mechanism, for example.

Also, to assure a maximum playback characteristic for the conventional MD, next-generation MD1 and MD2, different in physical specifications of the medium surface among them, the disk drive 10 has provided in the optical path of the optical pickup head 22 a phase compensation plate to optimize the bit error rate at the time of data reading for both the conventional MD and next-generation MDs.

A magnetic head 23 is disposed opposite to the optical pickup head 22 across the disk 90. The magnetic head 23 applies a magnetic field modulated by data to be recorded to the disk 90. Also, there are provided a sled motor and sled mechanism (not shown) to move the optical head 22 as a whole and the magnetic head 23 radially of the disk.

The medium drive 11 includes a write/read head system formed from of the optical pickup head 22 and magnetic head 23 and a disk rotation drive system formed from the spindle motor 21, and also a recording processing system, playback processing system, servo control system, etc. The recording processing system includes a block to make the EFM modulation and ACIRC encoding for the recording to the conventional MD, and a block to make RLL (1-7) PP modulation and RS-LDC encoding for the recording to the next-generation MD1 and MD2.

Also, the playback processing system includes a block to make a demodulation corresponding to the EFM modulation and ACIRC decoding for the playback of the conventional MD, and a block to make a demodulation (PR (1, 2, 1) ML and RLL (1-7) demodulation based on the data detection using the Viterbi decoding)) corresponding to the RLL (1-7) PP modulation and RS-LDC decoding for the playback of the next-generation MD1 and MD2.

Information detected as a return component of the laser light projected to the disk 90 from the optical pickup head 22, that is, photoelectric current from the photodetector detecting a reflected laser light from the disk, is supplied to an RF amplifier 24. The RF amplifier 24 makes current-voltage conversion, amplification, matrix calculation, etc. of supplied detection information to extract read RF signal, tracking error signal TE, focus error signal FE, groove information (ADIP information recorded as wobble of the recording track on the disk 90), etc.

For playback of the conventional MD, the read RF signal from the RF amplifier is passed to an EFM demodulator 27 and ACIRC decoder 28 through a comparator 25 and PLL circuit 26. The read RF signal is binarized in the EFM demodulator 27 to provide an EFM signal string, then undergoes EFM demodulation, and error correction and interleaving in the ACIRC decoder 28. In case the data is audio data, it will be ATRAC-compressed data at this time. A selector 29 is set to a conventional MD side thereof, and the demodulated ATRAC-compressed data is supplied as read data from the disk 90 to a data buffer 30. In this case, the compressed data is supplied to the audio processor 19 in FIG. 22.

On the other hand, for playback of the next-generation MD1 and MD2, the read RF signal from the RF amplifier is passed to an RLL (1-7) PP demodulator 35 and RS-LDC decoder 36 through an A-D conversion circuit 31, equalizer (EQ) 32, PLL circuit 33 and PRML circuit 34. In the RLL (1-7) PP demodulator 35, the read RF signal undergoes data detection using the PR (1, 2, 1) ML and Viterbi decoding to provide read data as an RLL (1-7) code string. The RLL (1-7) code string is further subject to RLL (1-7) demodulation. Further, the data undergoes error correction and interleaving in the RS-LDC decoder 36.

In this case, the selector 29 is set to a next-generation MD1/MD2 side thereof, and the demodulated data is supplied as read data from the disk 90 to the data buffer 30. At this time, the demodulated data is supplied to the memory transfer controller 12 in FIG. 22.

Tracking error signal TE and focus error signal FE are supplied from the RF amplifier 24 to a servo circuit 37, and groove information is supplied to an ADIP decoder 38.

The ADIP decoder 38 extracts wobble component by limiting the frequency band of the groove information by a bandpass filter, and then extracts ADIP address via FM demodulation and biphase demodulation of the frequency band-limited groove information. The extracted ADIP address being information on absolute address on the disk is supplied to a drive controller 41 through an MD address decoder 39 when the disk is a conventional MD and next-generation MD1, and through a next-generation MD2 address decoder 40 when the disk is the next-generation MD2.

The drive controller 41 makes a predetermine control on the basis of each ADIP address. Also, the groove information is returned to the servo circuit 37 for servo control of the spindle.

The servo circuit 37 generates a spindle error signal for CLV servo control and ZCAV servo control on the basis of a error signal obtained by integrating the groove information with a phase difference from a read clock (PLL clock at the time of decoding), for example.

Also, the servo circuit 37 generates various servo control signals (tracking control signal, focus control signal, sled control signal, spindle control signal, etc.) on the basis of the spindle error signal, tracking error signal and focus error signal supplied from the RF amplifier 24 as above, a track jump command, access command, etc. from the drive controller 41, and supplies the servo control signals to a motor driver 42. Namely, the servo circuit 37 generates the various servo control signals by making necessary processes, such as phase compensation, gain processing, target value setting, of the servo error signals and commands.

The motor driver 42 generates predetermined servo drive signals on the basis of the servo control signal supplied from the servo circuit 37. The servo drive signals include a bi-axial drive signal to drive the bi-axial mechanism (in focus direction and tracking direction), sled motor drive signal to drive the sled mechanism, and spindle motor drive signal to drive the spindle motor 21. Such servo drive signals are used to make focus control, tracking control of the disk 90, and CLV or ZCAV control of the spindle motor 21.

For recording to or playback from the disk 90, the motor drive 42 is supplied with high-density data from the memory transfer controller 12 shown in FIG. 22, or with ordinary ATRAC-compressed data from the audio processor 19 in FIG. 22.

For recording to the conventional MD, the selector 43 is placed at the conventional MD side thereof so that am ACIRC encoder 44 and EFM modulator 45 will be put into operation. In this case, when the data is audio signal, compressed data from the audio processor 19 is interleaved in the ACIRC encoder 44 and an error correction code is added to the interleaved data, and then the data is EFM-modulated in the EFM modulator 45. The EFM-modulated data is supplied to a magnetic head driver 46 via the selector 43, and the magnetic head 23 applies a magnetic field based on the EFM-modulated data to the disk 90. Thus, the modulated data will be recorded to the disk 90.

For recording to the next-generation MD1 and MD2, the selector 43 is placed at the next-generation MD1/MD2 side thereof so that an RS-LDC encoder 47 and RLL (1-7) PP modulator 48 will be put into operation. In this case, high-density data sent from the memory transfer controller 12 is interleaved in the RS-LDC encoder 47 and an RS-LDC-based error correction code is added to the interleaved data, and then the data is subjected to RLL (1-7) modulation in the RLL (1-7) PP modulator 48.

The data to be recorded, modulated into an RLL (1-7) code string, is supplied to the magnetic head driver 46 via the selector 43, and the magnetic head 23 applied a magnetic field based on the modulated data to the disk 90 for recording data to the latter.

A laser driver/APC 49 is provided to drive the laser diode to emit a laser light for the aforementioned disk playback and recording, and also provide a so-called APC (automatic laser power control). More specifically, the optical pickup head 22 includes a laser power monitoring detector (not shown). A monitor signal supplied from the monitoring detector will be fed back to the laser driver/APC 49. The laser driver/APC 49 compares a current laser power obtained as a monitor signal with a preset laser power, and include an error between the current and preset laser powers in the laser drive signal, to thereby control the laser diode so that a laser power from the laser diode will be stable at a set value. The drive controller 41 sets values of the laser power for playback and recording, respectively, in a register in the laser driver/APC 49.

The drive controller 41 is instructed by the system controller 18 to control the system construction so that each of the aforementioned operations, that is, access, servo control, data write and data read, will be performed. It should be noted that each of dashed line-enclosed blocks in FIG. 23 can be built as a one-chip circuit.

Note that in case the disk 90 is preformatted with separate data track recording area and audio track recording area as shown in FIG. 16, the system controller 18 will instruct the drive controller 41 in the medium drive 11 for having an access based on the set recording area correspondingly to which the data to be recorded or reproduced is, the audio track or data track.

Also, the system controller 18 may be set to provide such a control that recording only either PC data or audio data to the loaded disk 90 is permitted while recording of other data to the disk 90 is inhibited. Say, the system controller 18 can provide a control for separate recording of PC data and audio data.

Therefore, the disk drive 10 is constructed as above to allow an interchangeability between the conventional MD and the next-generation MD1 and MD2.

5. Reproduction of Data Track Sector

The playback and recording of the next-generation MD1 and MD2 by the disk drive 10 having been described in the foregoing will be described herebelow. For access to the data area, the external PC 70 will give an instruction for recording or playback in units of "logical sector (will be referred to as "FAT sector" hereunder)", for example, is given to the system controller 18 in the disk drive 10 via the USB interface 16. The data clusters are grouped at every 2,048 bytes as viewed from the PC 70, as shown in FIG. 17, and managed in the ascending order of USN on the basis of the FAT file system. On the other hand, the minimum unit of rewriting data track on the disk 90 is a next-generation MD cluster having a size of 65,536 bytes. Each of the next-generation MD cluster is assigned an LCN.

The FAT-referenced data sector size is smaller than the next-generation MD cluster. Therefore, the disk drive 10 has to convert a FAT-referenced user sector into a physical ADIP address, and convert write/read in units of FAT-referenced data sector into that in units of next-generation MD cluster with the use of the cluster buffer memory 13.

Figure 24:
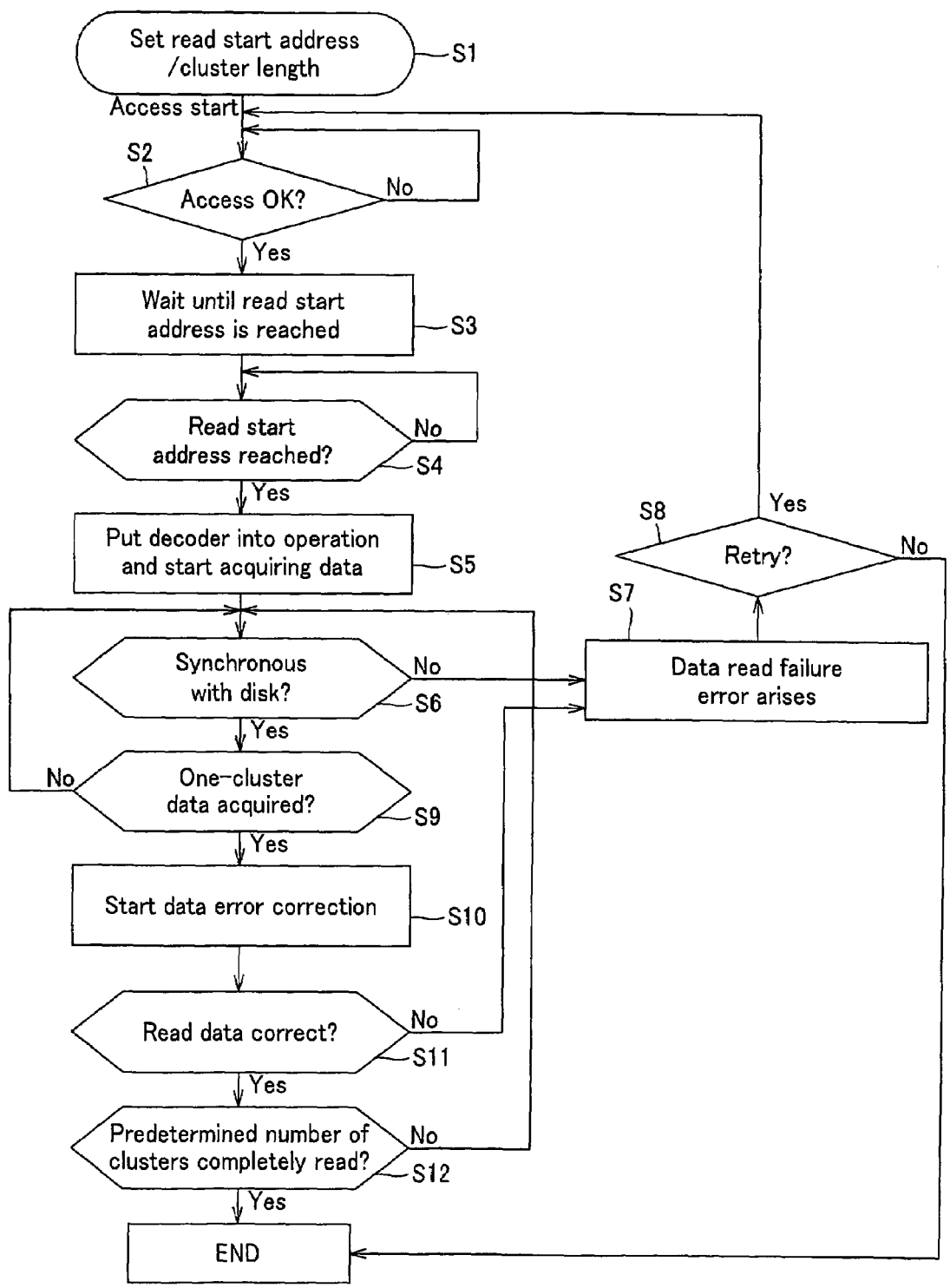
FIG. 24 shows a flow of operations made in a system controller in the disk drive when the system controller has received a request for read of a FAT sector from a PC.

FIG. 24 shows a flow of operations made by the system controller 18 in the disk drive 10 when it is requested from the PC 70 to read a FAT sector.

Receiving a command for reading FAT sector #n from the PC 70 via the USB interface 16, the system controller 18 will determine a next-generation MD cluster number including a FAT sector whose number is the designated FAT sector number #n.

The system controller 18 first determines a provisional next-generation MD cluster number u0. Since the next-generation MD cluster has a size of 65,536 bytes and the FAT sector has a size of 2,048 bytes, 32 FAT sectors are included in one next-generation MD cluster. Therefore, the system controller 18 divides the FAT sector number (n) by 32 (with the remainder being rounded down), and takes the result (u0) as the provisional next-generation MD cluster umber.

Next, Making reference to disk information having been read from the disk 90 into the auxiliary memory 14, the system controller 18 determines a number (ux) of next-generation MD clusters for other than data recording, that is, a number of next-generation MD clusters in the secure area.

As above, the next-generation MD clusters in the data track include some that are not disclosed as any writable/readable area. Therefore, the system controller 18 will determine a number (ux) of non-disclosable clusters on the basis of the disk information having been re-read into the auxiliary memory 14. Thereafter, the system controller 18 adds the number (ux) of non-disclosable clusters to the next-generation MD cluster number (u0), and takes the result (u) as an actual next-generation MD cluster number #u.

Having determined the next-generation MD cluster number #u including the FAT sector number #n, the system controller 18 judges whether the next-generation MD cluster whose number is #u has been read from the disk 90 and stored in the cluster buffer memory 13. If the result of judgment is negative (NO), the system controller 18 will read that next-generation MD cluster from the disk 90.

The system controller 18 reads the next-generation MD cluster from the disk 90 by determining the ADIP address #a from the read next-generation MD cluster number #u.

The next-generation MD cluster is divided in a plurality of parts on the disk 90 and recorded thereon. Therefore, to determine an actual recording ADIP address, it is necessary to search these parts one after another. To this end, the system controller 18 will first determine a number (p) of next-generation MD clusters and top next-generation MD cluster number px, recorded in the top part of the data track, from the disk information having been read into the auxiliary memory 14.

Since each of the parts of the next-generation MD cluster has recorded therein a start address/end address by an ADIP address, the system controller 18 will be able to determine the number (p) of next-generation MD clusters and the top next-generation cluster number px on the basis of the ADIP cluster address and part length. Next, the system controller 18 will judge whether the part includes a next-generation MD cluster having the cluster number #u in consideration. If the result of judgment is negative, the system controller 18 will search a next one of the parts that is suggested by link information in the part in consideration. With the above operations, the system controller 18 will search the parts stated in the disk information one after another for the target next-generation MD cluster.

When the system controller 18 finds a part having the target next-generation MD cluster (#u) recorded therein, it will determine a difference between a next-generation MD cluster number px recorded at the top of that part and the target next-generation MD cluster number #u, to thereby detect an offset from of the part top to the target next-generation MD cluster (#u).

In this case, since two next-generation MD clusters are written in one ADIP cluster, the offset can be converted into an ADIP address offset f (=(u−px)/2) by dividing the offset by two.

However, when the division results in a fraction of 0.5, the two next-generation MD clusters will be written in the ADIP cluster f starting at the center of the latter. Finally, the system controller 18 can determine an ADIP address #a of a destination where the next-generation MD cluster (#u) is to be actually written by adding the offset f to the top ADIP address of the part, that is, cluster address portion of the start address of the part.

The aforementioned operations are done during setting of read start address and cluster length in step S1 in FIG. 24. It should be noted here that the description will be made on the assumption that the judgment of which the medium to be played back is, the conventional MD, next-generation MD1 or MD2, has already been completed.

Having determined the ADIP address #a, the system controller 18 will instruct the medium drive 11 to access the ADIP address #a. Thus, the medium drive 11 will be controlled by the drive controller 41 to access the ADIP address #a.

In step S2 in FIG. 24, the system controller 18 wait until the access to the ADIP address #a is completed. When the access is complete, the system controller 18 goes to step S3 where it will wait until the optical pickup head 19 arrives at a target read start address. When the system controller 18 confirms, in step S4, that the optical pickup head 22 has arrived at the read start address, it goes to step S5 where it will instruct the medium drive 11 to start reading the data for one cluster from the next-generation MD cluster.

Correspondingly, the medium drive 11 is controlled by the drive controller 41 to start reading data from the disk 90. The medium drive 11 supplies the memory transfer controller 12 with data read by the playback system consisting of the optical pickup head 22, RF amplifier 24, RLL (1-7) PP demodulator 35 and RS-LDC decoder 36.

At this time, the system controller 18 will judge, in step S6, whether the disk drive 10 is synchronous with the disk 90. If the disk drive 10 is not synchronous with the disk 90, the system controller 18 will produce, in step S7, a signal indicating that a data read error has arisen. If it is judged in step S8 that read is to be retried, the system controller 18 will repeat the above operations starting at step S2.

Having acquired the data for one cluster, the system controller 18 will start, in step S10, making error correction of the acquired data. If it is judged in step S11 that the acquired data includes an error, the system controller 18 will return to step S7 where it will produce a signal indicating that a data read error has arisen. If it is judged in step S11 that the acquired data includes no error, the system controller 18 goes to step S12 where it will judge whether a predetermined cluster has been acquired or not. If it is judged that the predetermined cluster has been acquired, the system controller 18 will exit the sequence of operations and wait until the medium drive 11 reads the disk, and store data read and supplied to the memory transfer controller 12 into the cluster buffer memory 13. If no data is acquired, the system controller 18 will repeat the aforementioned operations starting at step S6.

The one-cluster data in the next-generation MD cluster, read into the cluster buffer memory 13 includes several FAT sectors. Therefore, the system controller 18 will detect data storage location of a requested one of the FAT sectors and send data for one FAT sector (2,048 bytes) from the USB interface 15 to the external PC 70. More specifically, the system controller 18 will determine, based on the requested FAT sector number #n, a byte offset #b in a next-generation MD cluster including the requested FAT sector number #n. Then, the system controller 18 will read data for one FAT sector (2,048 bytes) from the location of the byte offset #b in the cluster buffer memory 13, and transfers the data to the PC 70 via the USB interface 15.

With the aforementioned operations, it is possible to read and transfer a next-generation MD sector in response to a request for reading of one FAT sector from the PC 70.

6. Write to Data Track Sector

Next, there will be described with reference to FIG. 25 a flow of operations made in the system controller 18 in the disk drive 10 when the system controller 18 has received a request for writing of a FAT sector from the PC 70.

Receiving a command for write of a FAT sector #n from the PC 70 via the USB interface 16, the system controller 18 will determine a next-generation MD cluster number including a FAT sector whose number is the designated FAT sector number #n.

After determining a next-generation MD cluster of the number #u including the FAT sector number #n, the system controller 18 will judge whether the next-generation MD cluster having the requested cluster number #u has already been read from the disk 90 and read in the cluster buffer memory 13. If the result of judgment is negative (NO), the system controller 18 will perform operations to read the next-generation MD cluster having the cluster number #u from the disk 90. Namely, the system controller 18 instructs the medium driver 11 to read the next-generation MD cluster having the cluster number #u, and store the next-generation MD cluster thus read into the cluster buffer memory 13.

Also, the system controller 18 will determine, based on the FAT sector number #n it has been requested to read, a byte offset #b in a next-generation MD cluster including the FAT sector number #n. Next, the system controller 18 receives data of 2,048 bytes transferred from the PC 70 and which is to be written to the FAT sector (#n) via the USB interface 15, and writes the data for one FAT sector (2,048 byes) starting at the position of the byte offset #b in the cluster buffer memory 13.

Thus, the data in the next-generation MD cluster (#u) stored in the cluster buffer memory 13 will have only the PC 70-designed FAT sector (#n) thereof rewritten. The system controller 18 will write the next-generation MD cluster (#u) stored in the cluster buffer memory 13 to the disk 90.

Figure 25:
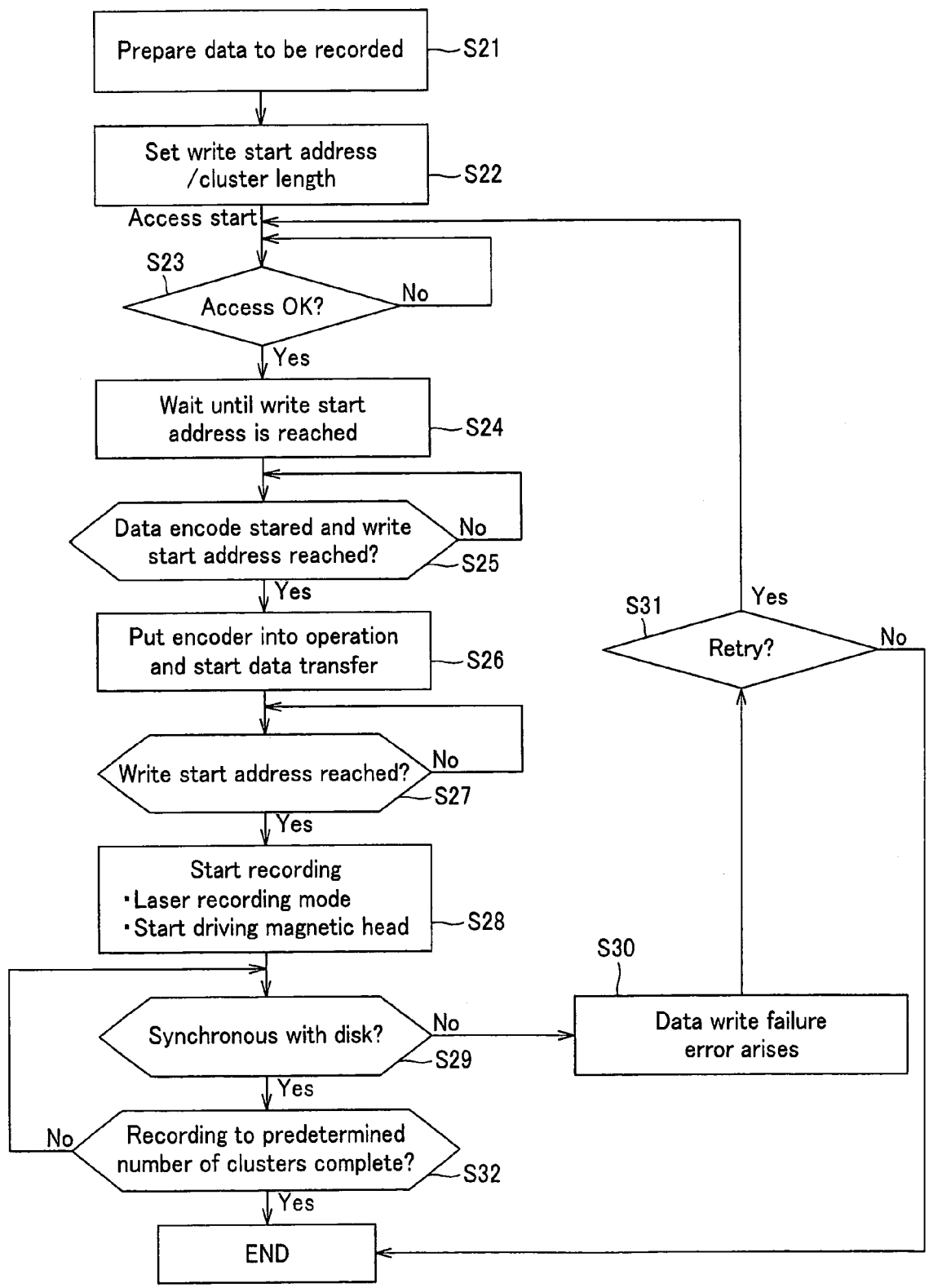
FIG. 25 shows a flow of operations made in the system controller in the disk drive when the system controller has received a request for write of a FAT sector from the PC.

The aforementioned operations are done in step S21 in FIG. 25 for preparation of data to be recorded. Also in this case, it is assumed that the medium type has already been done by any other method.

Next, the system controller 18 sets, in step S22 in FIG. 25, ADIP address #a of write start position starting with the next-generation MD cluster #u to which data is to be written. When setting the ADIP address #a, the system controller 18 will instruct the medium drive 11 to access the ADIP address #a. Thus, the medium drive 11 is controlled by the drive controller 41 to access the ADIP address #a.

After confirming in step S23 that the medium driver 11 has accessed the ADIP address #a, the system controller 18 goes to step S24 where it will wait until the optical pickup head 22 arrives at a target write start address. The system controller 18 confirms in step S25 that the optical pickup head 22 has arrived at the data encode address, it goes to step S26 where it will instruct the memory transfer controller 12 to start transfer of data in the next-generation MD cluster (#u) from the cluster buffer memory 13 to the medium drive 11.

Next, the system controller 18 judges in step S27 whether the optical pickup head 22 has arrived at the write start address. If the result of judgment is affirmative (YES), the system controller 18 goes to step S28 where it will instruct the medium drive 11 to start writing the data in the next-generation MD cluster to the disk 90. Accordingly, the medium drive 11 is controlled by the drive controller 41 to start data write to the disk 90. Say, the disk drive 41 will record the data transferred from the memory transfer controller 12 by means of the recording system consisting of the RS-LDC encoder 47, RLL (1-7) PP modulator 48, magnetic head driver 46, magnetic head 23 and optical pickup head 22.

At this time, the system controller 18 will judge in step S29 whether the disk drive 10 is synchronous with the disk 90. If the disk drive 11 is not synchronous with the disk 90, the system controller 18 goes to step S30 where it will produce a signal indicating that a data read error has arisen. If it is judged in step S31 that read is to be retried, the system controller 18 will repeat the aforementioned operations starting at step S23.

When one-cluster data has been acquired, the system controller 18 goes to step S32 where it will judge whether a predetermined cluster has been acquired or not. If the result of judgment is affirmative (YES), the system controller 18 will exit the sequence of operations.

With the aforementioned operations, it is possible to write the FAT sector data to the disk 90 in response to a request for writing of one FAT sector from the PC 70. Namely, write in units of FAT sector is performed as rewrite in units of next-generation MD cluster to the disk 90.

Note that the present invention is not limited to the aforementioned embodiments but can be applied to various magneto-optical disks other than the embodiments. Namely, also in any of the conventional mini-disk (MD) having a small diameter of 64 mm, next-generation MD1 and next-generation MD2, it is possible to suppress noises from other areas than the recording track and thus improved the detrack characteristic of the disk at the time of disk playback by recording an initial pattern whose frequency is higher than MTF to the other areas than the recording track. According to the present invention, it is possible to improve the detrack characteristic at the time of disk playback in any of the mini disks (MD) having been described above by magnetizing the disk in a direction opposite to that of a fringing field applied with the disk loaded in the disk drive unit.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

The present invention provides a disk-shaped recording medium to be played by a disk player which reproduces information from the recording medium by an optical pickup head including a drive means which uses an electromagnetic force as the driving force, and in which a signal for reducing the influence of a magnetic field by the optical pickup head so that the influence of a fringing field from the driving means included in the optical pickup head can be reduced to suppress noises caused by cross talk at the time of playback.

According to the present invention, the disk-shaped recording medium has a recording pattern whose frequency is higher than modulate transfer function (MTF) of an optical pickup head. Therefore, it is possible to suppress noses from other areas than the recording track and thus assure a good detrack characteristic at the time of playback without being influenced by the remaining nonuniform magnetization as in the initial state as well as by a drifting magnetic field caused by the uniform magnetization.

The invention claimed is:

1. A disk-shaped recording medium to be played in a disk drive unit which reproduces information recorded in the disk-shaped recording medium by an optical pickup head including a drive means which uses an electromagnetic force as the driving force,
the recording medium having recorded therein a signal which reduces the influence of an electromagnetic field applied by the optical pickup head, and
the recording medium is a magneto-optical disk which is played by the domain wall displacement detection (DWDD) method.

2. The recording medium as set forth in claim 1, wherein the signal recorded in the disk-shaped recording medium is recorded by magnetization made in a direction of reducing the influence of the electromagnetic field applied by the optical pickup head.

3. The recording medium as set forth in claim 1, wherein a recording track is formed and other areas than at least the recording track are magnetized in the same direction.

4. The recording medium as set forth in claim 1, wherein the signal which reduces the influence of the electromagnetic field applied by the optical pickup head is recorded in a direction opposite to a fringing field from the optical pickup head.

5. The recording medium as set forth in claim 1, wherein the signal recorded thereto is a recording pattern signal having a frequency higher than a modulation transfer function (MTF) of the optical pickup head.

6. A method of producing a disk-shaped recording medium to be played in a disk drive unit which reproduces information recorded in the disk-shaped recording medium by an optical pickup head including a drive means which uses an electromagnetic force as the driving force, the method comprising the step of:
recording to the recording medium a signal which reduces the influence of an electromagnetic field applied by the optical pickup head, wherein
the recording medium is a magneto-optical disk which is played by the domain wall displacement detection (DWDD) method.

7. The method as set forth in claim 6, wherein the recorded signal is recorded by magnetization in a direction of reducing the influence of the electromagnetic field applied by the optical pickup head.

8. The method as set forth in claim 6, wherein a recording track is formed and other areas than at least the recording track are magnetized in the same direction.

9. The recording medium as set forth in claim 6, wherein the signal which reduces the influence of the electromagnetic field applied by the optical pickup head is recorded in a direction opposite to a fringing field from the optical pickup head.

10. The recording medium as set forth in claim 6, wherein the signal recorded thereto is a recording pattern signal having a frequency higher than a modulation transfer function (MTF) of the optical pickup head.

11. A disk drive unit which reproduces information recorded in a disk-shaped recording medium by an optical pickup head including a drive means which uses an electromagnetic force as the driving force, the apparatus comprising:
a recording means for recording to the disk-shaped recording medium a signal which reduces the influence of an electromagnetic field applied by the optical pickup head, wherein
the signal recorded thereto is a recording pattern signal having a frequency higher than a modulation transfer function (MTF) of the optical pickup head.

12. The method as set forth in claim 11, wherein the recorded signal is recorded by magnetization in a direction of reducing the influence of the electromagnetic field applied by the optical pickup head.

13. The method as set forth in claim 11, wherein a recording track is formed and other areas than at least the recording track are magnetized in the same direction.

14. The recording medium as set forth in claim 11, wherein the signal which reduces the influence of the electromagnetic field applied by the optical pickup head is recorded in a direction opposite to a fringing field from the optical pickup head.

15. A disk-shaped recording medium to be played in a disk drive unit which reproduces information recorded in the disk-shaped recording medium by an optical pickup head including a drive means which uses an electromagnetic force as the driving force,
the recording medium having recorded therein a signal which reduces the influence of an electromagnetic field applied by the optical pickup head, wherein
the signal recorded thereto is a recording pattern signal having a frequency higher than a modulation transfer function (MTF) of the optical pickup head.

16. The recording medium as set forth in claim 15, wherein the signal recorded in the disk-shaped recording medium is recorded by magnetization made in a direction of reducing the influence of the electromagnetic field applied by the optical pickup head.

17. The recording medium as set forth in claim 15, wherein a recording track is formed and other areas than at least the recording track are magnetized in the same direction.

18. The recording medium as set forth in claim 15, wherein the signal which reduces the influence of the electromagnetic field applied by the optical pickup head is recorded in a direction opposite to a fringing field from the optical pickup head.

19. The recording medium as set forth in claim 15, being a magneto-optical disk which is played by the domain wall displacement detection (DWDD) method.

20. A method of producing a disk-shaped recording medium to be played in a disk drive unit which reproduces information recorded in the disk-shaped recording medium by an optical pickup head including a drive means which uses an electromagnetic force as the driving force, the method comprising the step of:

recording to the recording medium a signal which reduces the influence of an electromagnetic field applied by the optical pickup head, wherein the signal recorded thereto is a recording pattern signal having a frequency higher than a modulation transfer function (MTF) of the optical pickup head.

21. The method as set forth in claim 20, wherein the recorded signal is recorded by magnetization in a direction of reducing the influence of the electromagnetic field applied by the optical pickup head.

22. The method as set forth in claim 20, wherein a recording track is formed and other areas than at least the recording track are magnetized in the same direction.

23. The recording medium as set forth in claim 20, wherein the signal which reduces the influence of the electromagnetic field applied by the optical pickup head is recorded in a direction opposite to a fringing field from the optical pickup head.

24. The recording medium as set forth in claim 20, being a magneto-optical disk which is played by the domain wall displacement detection (DWDD) method.

\* \* \* \* \*